US006259445B1

(12) United States Patent
Hennum et al.

(10) Patent No.: US 6,259,445 B1
(45) Date of Patent: *Jul. 10, 2001

(54) COMPUTER-BASED DOCUMENTATION AND INSTRUCTION

(75) Inventors: Erik Hennum, San Francisco; Landon L. Ott, Fremont, both of CA (US)

(73) Assignee: Informix, Inc., Menlo Park, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/888,925

(22) Filed: Jul. 7, 1997

(51) Int. Cl.⁷ ........................................... G06F 9/00
(52) U.S. Cl. ...................... 345/338; 345/339; 345/336
(58) Field of Search ................................ 345/114, 333, 345/336, 338, 357, 967, 339, 352; 395/702, 704

(56) References Cited

U.S. PATENT DOCUMENTS

| 5,432,903 | * | 7/1995 | Frid-Nielsen ................. 345/336 |
| 5,481,667 | * | 1/1996 | Bieniek et al. ................. 345/336 |
| 5,493,658 | * | 2/1996 | Chiang et al. ................. 345/338 |
| 5,602,996 | * | 2/1997 | Powers, III et al. ............ 345/344 |
| 5,717,879 | | 2/1998 | Moran et al. . |
| 5,786,815 | | 7/1998 | Ford . |
| 5,798,757 | | 8/1998 | Smith . |
| 5,883,639 | * | 3/1999 | Walton et al. ................. 345/473 |
| 5,953,011 | * | 9/1999 | Matsuoka ..................... 345/352 |

FOREIGN PATENT DOCUMENTS

| 0 436 459 | 7/1991 | (EP) . |
| 0 509 947 | 10/1992 | (EP) . |

OTHER PUBLICATIONS

Microsoft Word for Windows 95 Version 7.0 (copyright 1995) Online Help (OLH) System, WordBasic Reference Window, WordBasic Example Window (Screenshots A–D).
Selker, T., "Coach: A Teaching Agent That Learns", Communications of the Association for Computing Machinery, New York, vol. 37, No. 7, Jul. 1, 1994, pp. 93–99.
"Nethelp" (NetHelp Release 1.0 8 DK Documentation) and "Software Downloads", http://home.netscape.com/eng/help/sdkl/sdksite.html, pp. 1–14, p. 1, Aug. 1996.

* cited by examiner

*Primary Examiner*—John Cabeca
*Assistant Examiner*—Cao H. Nguyen
(74) *Attorney, Agent, or Firm*—Fish & Richardson P.C.

(57) ABSTRACT

User instruction on a computer system involves performing an interactive example and providing, in synchronization with the interactive example, explanatory information corresponding to the example. The explanatory information presented explains what most recently occurred in the interactive example and is updated automatically to correspond with the current state of the interactive example.

41 Claims, 30 Drawing Sheets

WordBasic Help

File  Edit  Book<u>m</u>ark  Options  <u>H</u>elp

| <u>C</u>ontents | <u>S</u>earch | Back | Print | << | >> | <u>I</u>ndex |

AddAddIn, AddAddIn()

☐ <u>Example</u>

---

AddAddIn *AddIn$ [, Load]*
AddAddIn(*AddIn$ [, Load]*)

The AddAddIn statement adds a template or Word add-in library (WLL) to the list of global templates and add-ins in the Templates And Add-ins dialog box (Templates command, File menu).

| <u>Argument</u> | <u>Explanantion</u> |
|---|---|
| *AddIn$* | The path and filename of the template or WLL |
| *Load* | Specifies whether to load the template or add-in after adding it to the list: |
| | 0 (zero)  Does not load the template or add-in |
| | 1 or omitted  Loads the template or add-in |

The AddAddIn() function behaves the same as the statement and also returns a value corresponding to the position of the global template or add-in in the list, where 1 is the first template or add-in, 2 is the second, and so on. This value may be used with other add-in statements and functions.

You can use functions defined in a loaded WLL in a macro. Functions that take no arguments may be used just like WordBasic statements; you can return the names of these functions using CountMacros() and MacroNames$(). Functions in the WLL that take arguments must be declared using the Declare statement.

For more information on loading global templates and add-ins, see Chapter 31, "Customizing and Optimizing Word," in the *Microsoft Word User's Guide*. For more information on using functions in WLLs, see Chapter 9, "More WordBasic Techniques," in the <u>Microsoft Word Developer's Kit</u>.

---

See Also
<u>Documents, Templates, and AddIns Statements and Functions</u>
<u>AddInState()</u>
<u>ClearAddIns</u>
<u>CountAddIns()</u>
<u>CountMacros()</u>
<u>DeleteAddIn</u>
<u>GetAddInID()</u>
<u>GetAddInName$()</u>
<u>MacroName$()</u>

PRIOR ART
FIG. 5B

NewEra by Example

NewEra by Example Introductory Topics

- Overview
- Before Using NewEra by Example
- How to Get Started
- Reading an Annotation
- Opening the Example Source Files
- Viewing Related Reference Material
- Running the Example
- Building the Examples Yourself

---

NewEra by Example

File  Edit  Bookmark  Options  Help

Help Topics | Back | << | >> | Run

Introducing NewEra by Example

NewEra by Example documents over 40 NewEra programming examples using Microsoft Online Help and the NewEra 3.0 tools. You can read about examples, see their source code in the NewEra Window Painter and Language Editor, and run them, all without leaving the online help environment.

NewEra by Example can be useful to you, the NewEra developer, in many ways. It can be a study tool to help you learn the NewEra programming language and development environment, because all the examples are integrated with the development environment, you can see how each example was created in the Window Painter, study the code in the Language Editor, read the reference documentation, and study the example at runtime.

NewEra by Example can also provide you with sample code, which you can cut and paste to use as a template for beginning your own NewEra applications.

Finally, you can use NewEra by Example to "play with" the NewEra development and runtime environments. As you navigate around the NewEra by Example help system, you gradually acquire more and more familiarity with the NewEra landscape.

Getting Around NewEra by Example

In the NewEra by Example help system, the list window shows all of the subtopics for the example you are currently examining. The list window you see at your left shows all of the subtopics for this introductory article. Click on any subtopic in the list window to open it here in the main help window.

Getting Started

To learn how to start using NewEra by Example right now, click here: How to Get Started

FIG. 7

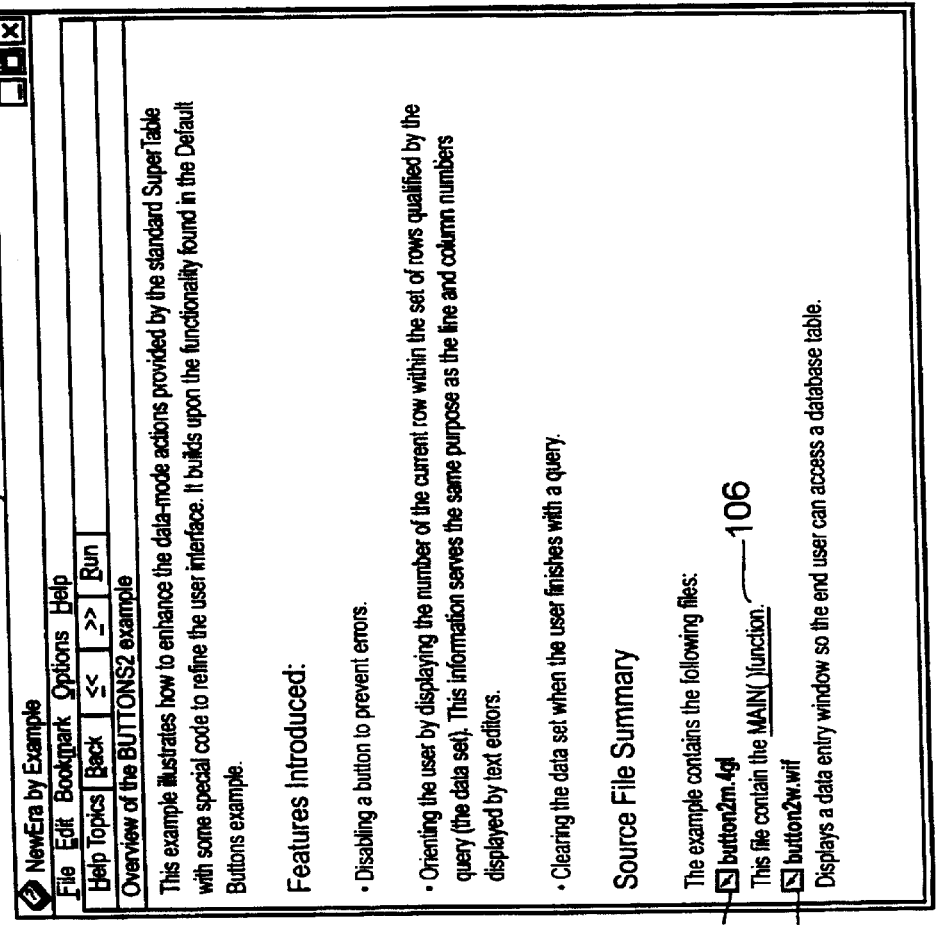
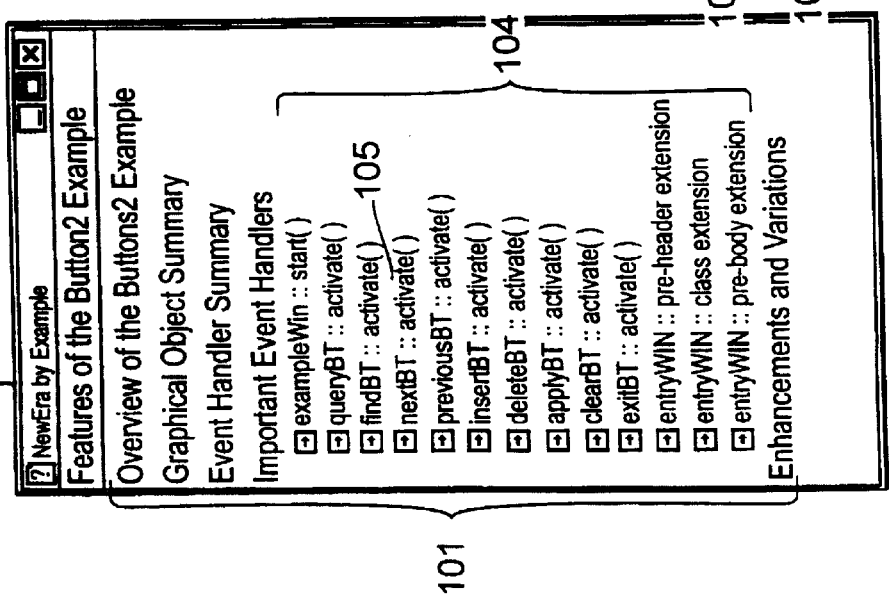
FIG. 10

FIG. 11

NewEra by Example
File Edit Bookmark Options Help
Help Topics | Back | << | < | >> | Run nextBT :: activate()

The activate handler for the Next button.

☐ button2w.wif - in nextBT handler for ixButton::activate event:

```
VARIABLE ok BOOLEAN
VARIABLE SuperTable ixSuperTable
VARIABLE rowPosition INTEGER LET SuperTable = (getVisualContainer() CAST ixSuperTable)

LET rowPosition = SuperTable.getCurrRowNum() +1
```

Get the number of rows for the current displayMode:
```
IF rowPosition > SuperTable.getNumStoredRows(NULL) THEN}
   LET rowPosition = ixSuperTable::lastRow
END IF
```

Don't do anything w/ the return status:
```
LET ok = SuperTable.setCurrentCell(rowPosition, ixSuperTable::currentColumn)}
```

Set the button states:
```
CALL (getWindow() CAST exampleWin).resetSuperTableButtons( )}
```

Show the current row position:
```
CALL (getWindow() CAST exampleWin).showRowInfo()}
```

NewEra by Example

Features of the Edit Menu Example

Overveiw of the Edit Menu Example

The MAIN ( ) function

Graphical Object Summary

Event Handler Summary

Important Event Handlers

- edit1TB :: focusin ( )
- edit2TB :: focusin ( )
- noneditCB :: focusin ( )
- exitMI :: activate ( )
- cutMI :: activate ( )
- copyMI :: activate ( )
- pasteMI :: activate ( )
- deleteMI :: activate ( )

Extension Summary

Important Extensions

- editWin :: class extension
- editWin :: preheader extension
- editWin :: prebody extension

/70

NewEra by Example

File  Edit  Bookmark  Options  Help

Help Topics | Back | << | >> | Run

Overveiw of Edit Menu

This example provides a standard Edit menu to cut copy, paste, and delete text from a text box.

Features Introduced

- Creating menus and menu items.
- Executing code when the user chooses a menu item.
- Executing built-in clipboard functions.
- Finding the current control in an application.
- Specifying an accelerator key for a menu item.
- Executing code when the user enters a control.
- Enabling and disabling menu items.

Source File Summary

- editm.4gl
Initializes the application by creating the editWin window. The MAIN ( ) function of the application is in this file.
- editw.wif
Provides a window with an edit menu and some demonstration text boxes.

NewEra by Example

Features of the Edit Menu Example

Overview of the Edit Menu Example

The MAIN ( ) function

Graphical Object Summary

Event Handler Summary

Important Event Handlers
- edit1TB :: focusin ( )
- edit2TB :: focusin ( )
- noneditCB :: focusin ( )
- exitMI :: activate ( )
- cutMI :: activate ( )
- copyMI :: activate ( )
- pasteMI :: activate ( )
- deleteMI :: activate ( )

Extension Summary

Important Extensions
- editWin :: class extension
- editWin :: preheader extension
- editWin :: prebody extension

---

NewEra by Example

File  Edit  Bookmark  Options  Help

Help Topics | Back | << | >> | Run edit1TB :: focusIn( )

editw.wif - in edit1TB handler for ixTextBox::focusIn event:

```
VARIABLE
    win editWin = getWindow ()

CALL win.setEditItemsEnabled( SELF )
```

LET editWin = getWindow ( )

In the handler of the window, the members of the window are in scope. The members in scope include the graphical objects that you paint within the window.

In the handlers of other graphical objects, however, the members of the window are not in scope. You have to qualify a member with a reference to the window.

Each graphical object has the getWindow () member function, which conveniently returns a reference to the window. You can capture the reference in a local variable of the handler.

```
CALL win.setEditItemsEnabled( TRUE )
```

The example uses the reference to qualify the call to the setEditItemsEnabled()function. The call passes the TRUE parameter to enable the editing menu items while the user is in the text box.

---

Edit Window

File  Edit

[Text to edit]  ☐ CheckBox

[More text to edit]  [Start Editor]

Use the edit menu to cut and paste text from one textbox to the other. Use the button to start a text editor so you can paste in the editor. Tab to the checkbox and button to see disabling of the menu items.

FIG. 16C

NewEra by Example

File  Edit  Bookmark  Options  Help

| Help Topics | Back | << | >> | Run | edit2TB :: focusIn( )

☐ edit rw.wif - in edit2TB handler for ixTextBox::focusIn event:

```
VARIABLE
    win editWin = getWindow ()

CALL win.setEditItemsEnabled( SELF )
```

Calls the setEditItemsEnabled ( ) function to enable the editing menu items when the user enters the text box. See also the discussion of edit1TB::focusIn ( )

NewEra by Example

Features of the Edit Menu Example

Overview of the Edit Menu Example

The MAIN ( ) function

Graphical Object Summary

Event Handler Summary

Important Event Handlers

- ☐ edit1TB :: focusIn ( )
- ☐ edit2TB :: focusIn ( )
- ☐ noneditCB :: focusin ( )
- ☐ exitMI :: activate ( )
- ☐ cutMI :: activate ( )
- ☐ copyMI :: activate ( )
- ☐ pasteMI :: activate ( )
- ☐ deleteMI ::activate ( )

Extension Summary

Important Extensions

- ☐ editWin :: class extension
- ☐ editWin :: preheader extension
- ☐ editWin :: prebody extension

Edit Window

File  Edit

| Text to edit |
| More text to edit |  ☐ CheckBox

Start Editor — 164

Use the edit menu to cut and paste text from one textbox to the other. Use the button to start a text editor so you can paste in the editor. Tab to the checkbox and button to see disabling of the menu items.

```
        FUNCTION driveStockRpt( destType SMALLINT, destName CHAR(*) )
190    RETURNING VOID
       {.normal
       Since objects, in particular ixRow objects, cannot be passed
       as arguments to the report formatter, rows of fetched data will
       be unpacked into a record that matches the data types and lengths
       of elements in the fetched rows.
       }
       VARIABLE
              stockRec RECORD
                     mn CHAR(15),      -- manufact.manu_name
                     sn SMALLINT,      -- stock.stock_num
                     sd CHAR(15),      -- stock.description
                     sp MONEY(6,2),    -- stock.unit_price
                     su CHAR(4)        -- stock.unit
              END RECORD stockStmt ixSQLStmt,
              stmtString CHAR(*),
              stockRow ixRow, errorCode INTEGER,
              logFile ixErrorLog
191
       {.normal
       Use the implicit connection object to create an SQL statement
       object. The connection object must already be connected to a
       database.
       Checking the status of the prepare( ) call will confirm this.
192    }
       {.[edit stmt}
       LET stockStmt =
       ixSQLConnect::getImplicitConnection().createStmtObject()
         {.]file stmt}
193
```

FIG. 19

COMPUTER-BASED DOCUMENTATION AND INSTRUCTION

BACKGROUND

This invention relates to computer-based documentation and instruction.

A typical computer system as shown in FIG. 1 includes a computer 11 having a central processing unit 12, an input/output unit 13 and a memory 14 containing various programs used by the computer 11 such as an operating system 15 and one or more application programs 16. An end-user of the computer system communicates with the computer 11 by means of various input devices (keyboard 17, mouse 18) which transfer information to the computer 11 via input/output unit 13. The computer 11 replies to this input data, among other ways, by providing responsive output to the end-user, for example, by displaying appropriate text and images on the screen of a display monitor 19.

The operating system 15 may include a graphical user interface ("GUI") by which the operating system and any applications it may be running (e.g., a word-processing program) can communicate with a user of the computer system. A commonly used GUI implementation employs a desktop metaphor in which the screen of the monitor is regarded as a virtual desktop. The desktop is an essentially two-dimensional working template area supporting various graphical objects, including one or more display regions. As shown in FIG. 2, information generated by application programs or the operating system can be displayed on the desktop 21 within display regions 23 (e.g., windows, dialog boxes, pop-up menus, pull-down menus, drop-down lists, icons). The user can interact with the operating system, and any applications it may be running, by manipulating the cursor 24 appropriately within the display regions and by entering information with the keyboard or other input device.

To use an application program effectively, a user must know not only how to interact with the application itself, but depending on the nature of the application, the user also must possess a body of substantive knowledge relating to the subject matter to which the application pertains. For example, if the application is a software development environment, the user must be familiar with computer programming concepts and programming languages to use the application effectively.

Most computer applications provide an online help/documentation facility which aids in the use of the application. A typical online help system such as shown in FIG. 3A is accessed through a GUI in which screens of textual and graphical information are displayed to the user in a help window 30. The user can then read the screens of help text to get a better understanding of the application and its various features.

The user invokes the help system with a key sequence (e.g., pressing the F1 key on the keyboard) or by clicking the mouse on an appropriate graphical icon or menu item. In response, the help system may display a table of contents 31 listing the available help topics and subtopics which can be accessed and viewed by the user as desired. The user can browse through the table of contents 31 and click a help topic of interest to cause its corresponding body of information to be displayed in a help window. In the help window 30 shown in FIG. 3A, the user has clicked the "Programming with Microsoft Word" topic 31 to cause the corresponding help screen 32 to be displayed in window 30 as shown in FIG. 3B.

The "Programming with Microsoft Word" topic 31 shown in FIG. 3B includes several subtopics 33, each represented by a separate "link." When the user clicks the mouse on one of these links—for example, the "Error Messages" link 34—the text for the corresponding help topic is displayed automatically in the help window 30, as shown in FIG. 3C. In this example, the "Error Messages" topic 35 includes several links to further subtopics relating to specific types of error messages. As shown in FIG. 3D, when the user clicks one of these links, for example, the "Out of memory (stack space)" link 25, a new help window 36 is spawned to display the corresponding help information ("Freeing up memory") for the selected topic. The help information displayed in window 36 includes yet another link 37 for another subtopic, "active window," which when clicked by the user causes corresponding help text to appear in a pop-up dialog box 38. Virtually any level of such nested help displays is possible. The quantity and types of display regions (windows, dialog boxes, etc.) used to display help information is largely a matter of design choice based on the preferences of the help system developer.

A help system may provide "context-sensitive" help information, meaning that the help system automatically displays help information specifically relevant to the application's current task, rather than simply displaying all available help topics and forcing the user to identify and call-up the appropriate help topic manually. A context-sensitive help system decides which help information to display based on factors such as the current state of the application (e.g., the particular function being invoked by the user) and the current cursor position.

The information provided by most online help systems relates to the mechanics of using features of an application. In FIG. 4, for example, the text 42 corresponding to the chosen help topic 41, "Cancel printing," describes how to control the print feature provided by the application 40 (Microsoft Word).

A help system also may provide substantive information on how to make use of the application to achieve a desired goal. In FIG. 5A, for example, the online help system provides two types of substantive information: reference material 51 for the WordBasic programming language and practical explanations 52 of how to use WordBasic to write useful programs. The reference material 51 includes textual annotations describing the syntax and meaning of various WordBasic statements, such as the AddAddIn statement, the help text for which is shown in FIG. 5B. The practical explanations 52 can include static examples of program code which the user can study to gain a better understanding of the WordBasic programming language. FIG. 5C shows an example of program code that makes use of the GetCurValues WordBasic statement.

Online help systems typically are "built" (i.e., processed into a form that facilitates run-time operation) by compiling several different help source files containing help information that has been composed by technical writers. In general, these help source files are maintained as a separate body of information apart from the application to which the help system corresponds. Consequently, when the application developers change or update the functionality of the application, the technical writers must make corresponding changes to the help source files to ensure that the online help system accurately describes the operation of the application.

SUMMARY

In one aspect, user instruction on a computer system involves performing an interactive example or instructional demonstration and providing, in synchronization with the interactive example, explanatory information corresponding to the example. The explanatory information presented explains what most recently occurred in the interactive example and is updated automatically to correspond with the current state of the interactive example. The explanatory information may be presented concurrently or simultaneously with output from the interactive example. A user of the computer system is enabled to control the performance of the interactive example or the presentation of explanatory information.

Presentation of the explanatory information can include displaying multiple windows on a screen of the computer system, the explanatory information being displayed in one window and the output from the interactive example being displayed in another window. In response to a change in state of the interactive example, the explanatory information provided may be altered accordingly.

A user of the computer system also may be provided with access to online reference materials relating to the interactive examples, the explanatory information, or both. The online reference materials may be accessed through links in the explanatory information. When a user selects a particular link, for example, by clicking the link with a mouse cursor, corresponding reference information is presented to the user. The links in the explanatory information can be arranged in a logical hierarchy, each successive level in the hierarchy providing an increased degree of detail.

A user of the computer system also may be provided with access to source code associated with an interactive example. A fragment of source code associated with an interactive example may be displayed in an annotation associated with the example. The annotation also may include a prose description of the interactive example's operation. Access to the source code can be provided by an editing utility, which can be launched when a user of the computer system selects a visually indicated jump (e.g., a short-cut arrow) within the annotation. The user then can view, copy or modify the source code fragment in the context of the source code for the entire interactive example. The user can experiment with an interactive example by iteratively modifying the example's source code and then executing the modified example to see what happens.

An application for implementing concepts illustrated by the interactive examples may be provided to the user. The interactive examples provided by the computer-based instructional system can represent a subset of the functionality provided by the application. For example, the interactive examples may correspond to computer programming concepts. In that case, a software development environment may be provided to allow the user to implement the programming concepts illustrated by the interactive examples.

The interactive examples and the corresponding annotations describing the interactive examples can be built from a unified body of source code. Markup symbols, demarcating a portion of the source code to be used in building an interactive example and another portion of the source code to be used in building an annotation describing the interactive example, can be included in the unified body of source code. The portion of the source code to be used in building an interactive example can overlap the portion of the source code to be used in building the annotation describing the interactive example.

In another aspect, computer software can be developed by maintaining a body of source code for a computer-based application (e.g., an instructional example) and building the computer-based application based on the body of source code. Moreover, an annotation corresponding to the computer-based application can be built based on information extracted from the body of source code. The body of source code that is maintained can include both program instructions and explanatory information, which programmers (or a processing script) can distinguish from each other based symbols (e.g., markup symbols) appearing throughout the body of source code. The symbols can identify program instructions that are to be used for building interactive examples or source code fragments that are to be displayed to an end-user. Alternatively, or in addition, the symbols can define a manner in which the explanatory information is to be presented to an end-user.

An annotation can be built by parsing the body of source code to identify portions of the source code that correspond to the annotation. Parsing can be accomplished by processing the body of source code with a script that recognizes predetermined markup symbols appearing in the body of source code. Building of an annotation also may involve generating documentation source files based on a result of the parsing. The documentation source files then can be compiled into a format recognized by an online help utility. Parsing of the source code also can be used to generate example source code files, which can be compiled into interactive examples that can be executed by an end-user.

Development of the software also may include generating a jump that allows an end-user to access the body of source code at a location corresponding to a source code fragment displayed adjacent to the jump. Moreover, software development can include assembling a list of predetermined tokens (e.g., keywords or class names) appearing in the body of source code and generating a link to an online reference for each token in the assembled list.

Advantages may include one or more of the following. An instructional help system based on the documentation by example concept provides a learning environment, or laboratory, where users are provided with representative examples of proven techniques for successfully operating the application to accomplish a desired goal (e.g., programming a new application). By executing, inspecting, modifying, and copying from the examples provided, users are able to learn complex and sophisticated subject matters at an accelerated rate.

The documentation by example system described here provides enhanced training and instruction capabilities. Users can selectively execute any of several interactive examples and learn by observing their operation. In addition, a user's observations are reinforced by annotations which are displayed to the user as the example is executing. The annotations are coordinated automatically with execution of the examples such that the annotation text displayed at any given time is synchronized with the state of the example. As a result, the user can discern what just happened in the example by reading the annotation appearing on the screen. Moreover, users can learn more about the example at a desired level of detail by following links in the annotation to relevant background information.

The manner in which the documentation by example system is built and maintained guarantees that the interactive examples and their respective annotations are kept in synchronization. Because the source code for the interactive examples and the corresponding descriptive information are extracted directly from the same body of source code, the annotations always will reflect the current functionality of the interactive examples. Moreover, by including the examples' source code and their corresponding annotations within the same body of source code, maintenance of the documentation by example system is simplified dramatically. Because the components of the documentation by example system are integrated into, and updated along with, the interactive examples' source code, software developers need not separately update and build the documentation by example system each time the examples are changed. As a result, the interactive examples can be updated freely and frequently without incurring the administrative headaches of manually ensuring that the documentation system includes the most recent or correct versions of examples and their annotations.

Other advantages and features will become apparent from the following description, including the drawings and claims.

DESCRIPTION OF THE DRAWINGS

FIGS. 7 through 16E are screen shots from the Informix® by Example application and from the NewEra™ development environment.

FIG. 19 is a sample of NewEra™ source code.

DETAILED DESCRIPTION

The help information provided by conventional online help systems has proven useful in aiding users to make effective use of application programs. However, because these conventional online help systems essentially are limited to providing static textual or graphical information, their effectiveness is diminished considerably. Users of conventional online help systems gain instruction by reading and carefully studying the textual and graphical information provided by the help system and then applying its teachings to the problem to be solved. As a result, learning to use applications of any complexity often is a painstaking and time consuming process.

An online help and instruction system developed by Informix® Software, Inc., known as NewEra™ by Example, dramatically enhances the ease with which users can absorb information and learn to use new applications. NewEra™ by Example is an online documentation facility for NewEra™, an object-oriented application development environment from Informix® Software, Inc. which runs under the Windows 95/NT operating systems. A copy of NewEra™ by Example's online description of its use and operation is attached as Appendix A.

NewEra™ by Example (or more generally, Informix® by Example, which covers the example-based instruction systems provided for the NewEra™, Visual Basic and Java development environments) is a specific implementation of a more general concept referred to as "documentation by example" in which users are provided with dynamic, interactive examples demonstrating how to accomplish a given task. Annotations describing various aspects of the examples accompany the examples as they are being executed. Documentation by example is based in part on the premise that users learn best by doing something (e.g., participating in an activity and observing or influencing its outcome) rather than by merely reading about the topic.

Figure 1:
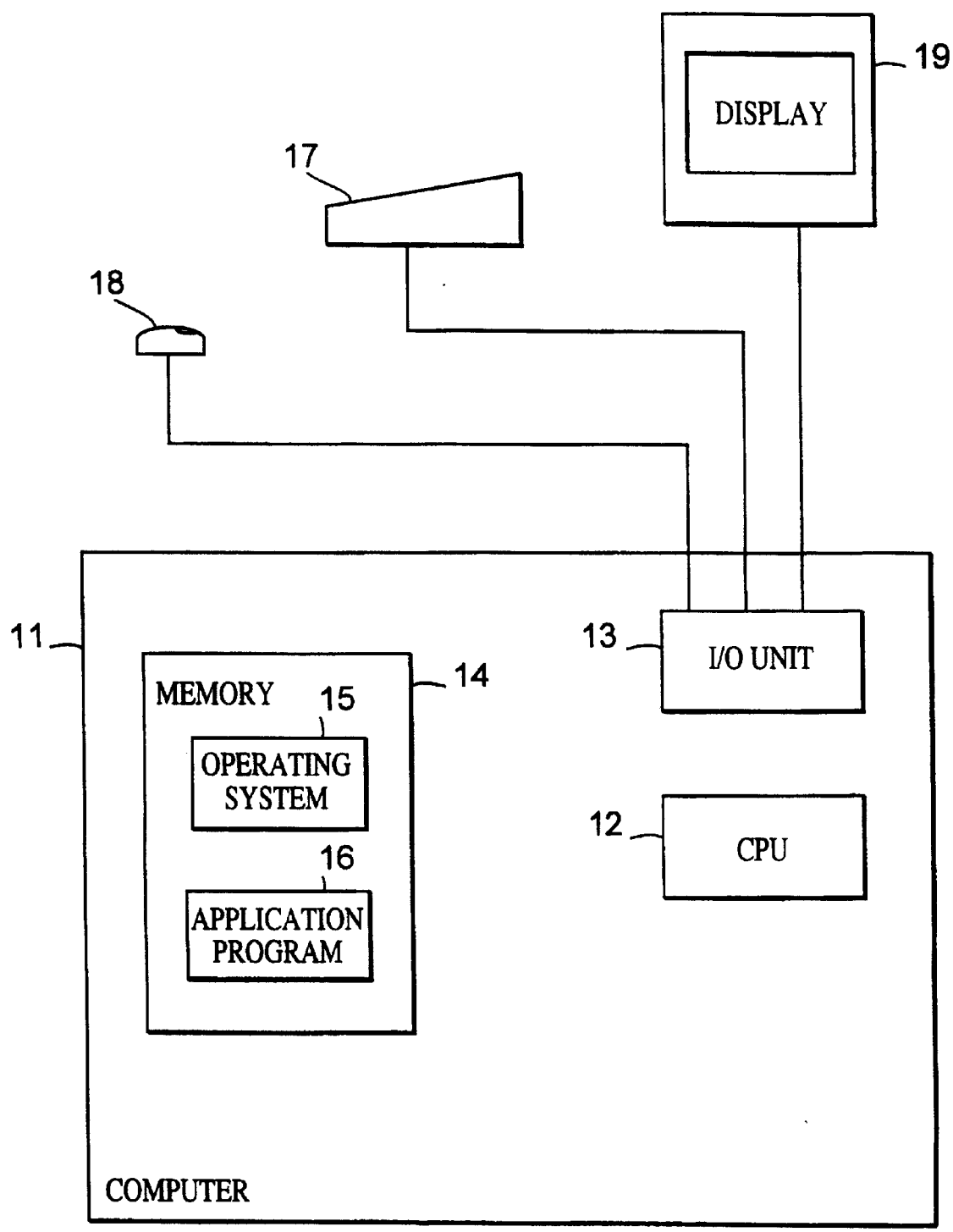
FIG. 1 is a block diagram of a prior art computer system.
Figure 2:
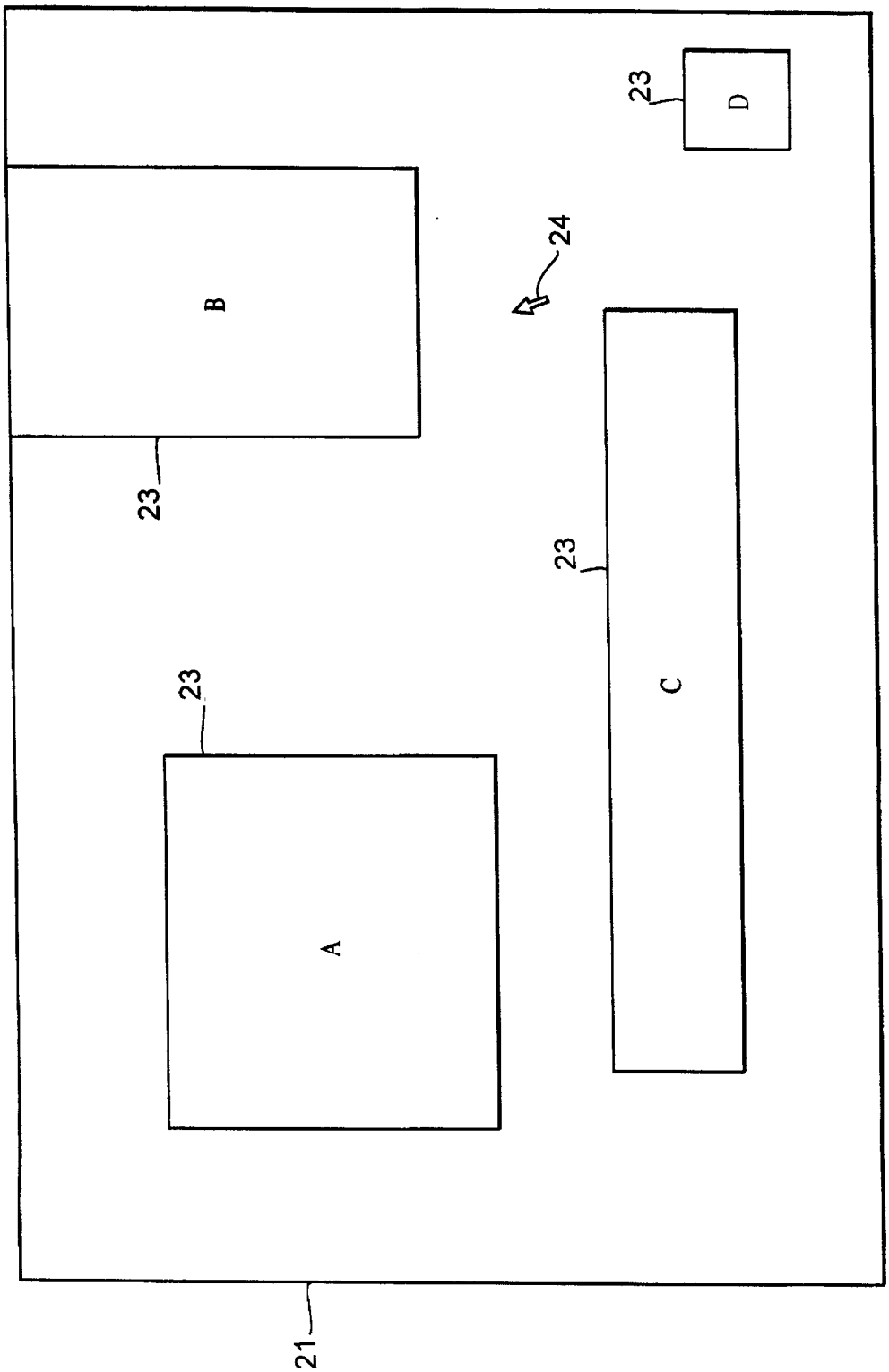
FIG. 2 shows display regions in a graphical user interface as used in the computer system of FIG. 1.
Figure 3A:
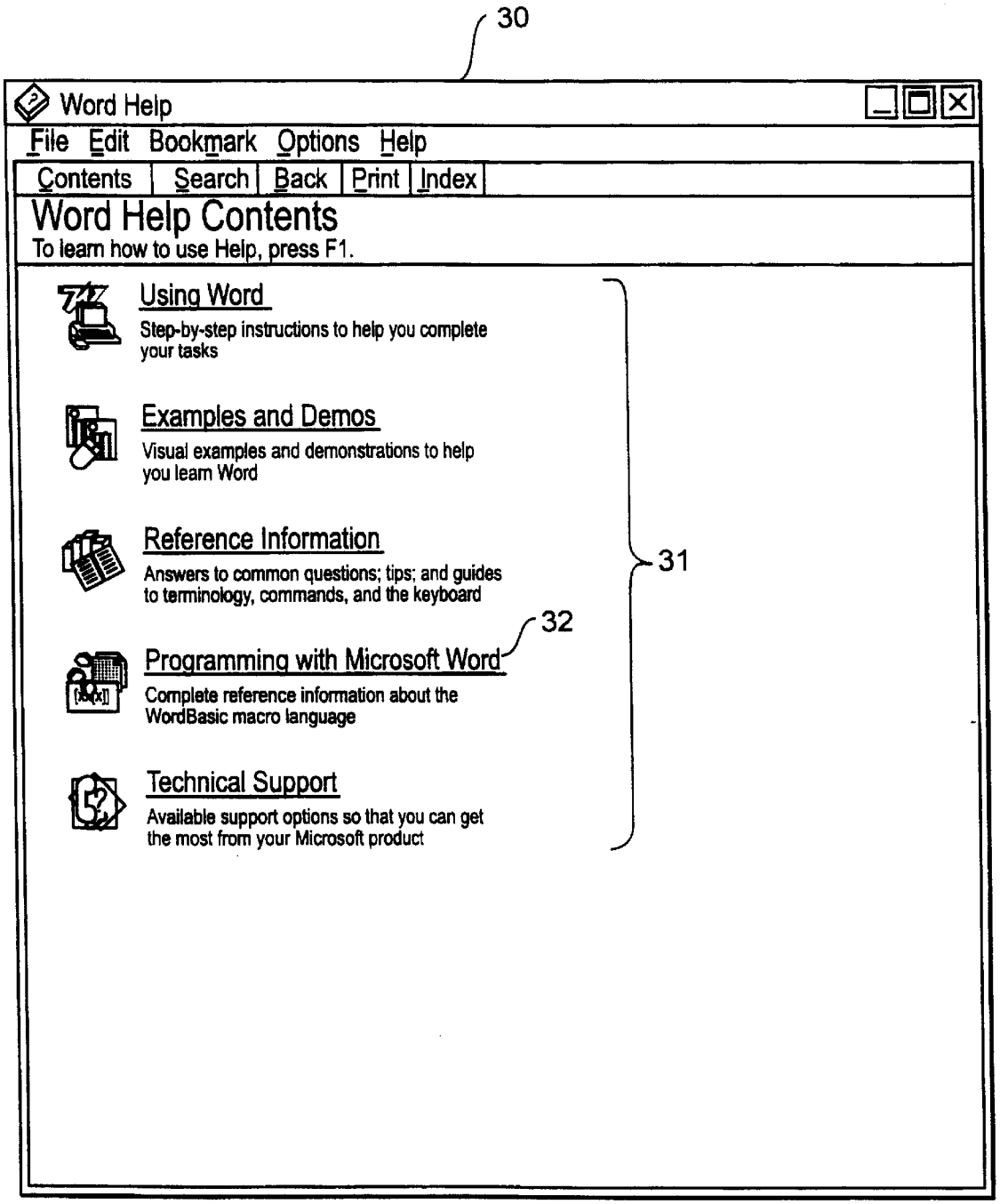
FIGS. 3A through 5C are screen shots from a prior art online help and documentation system.
Figure 3B:
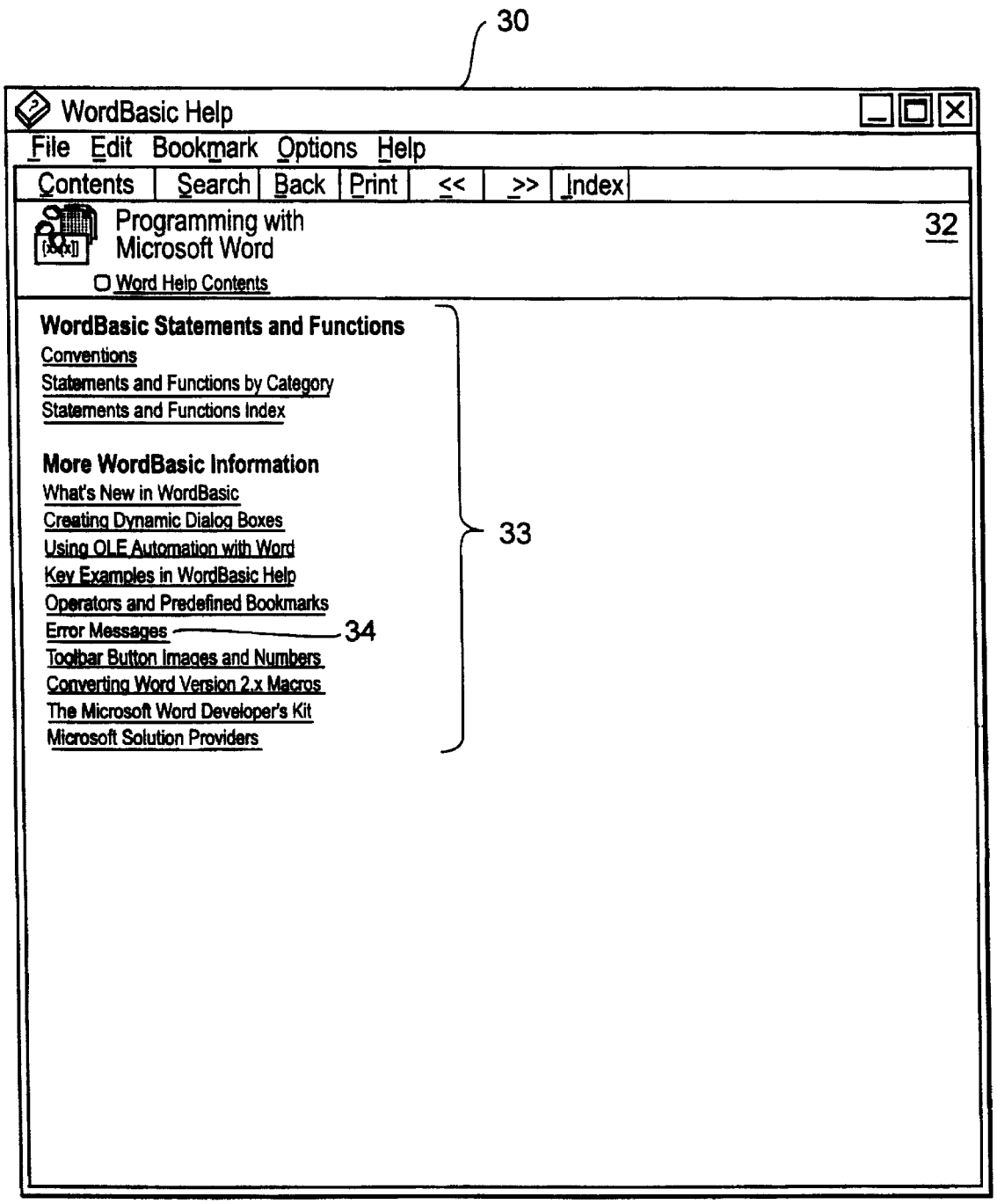
Figure 3C:
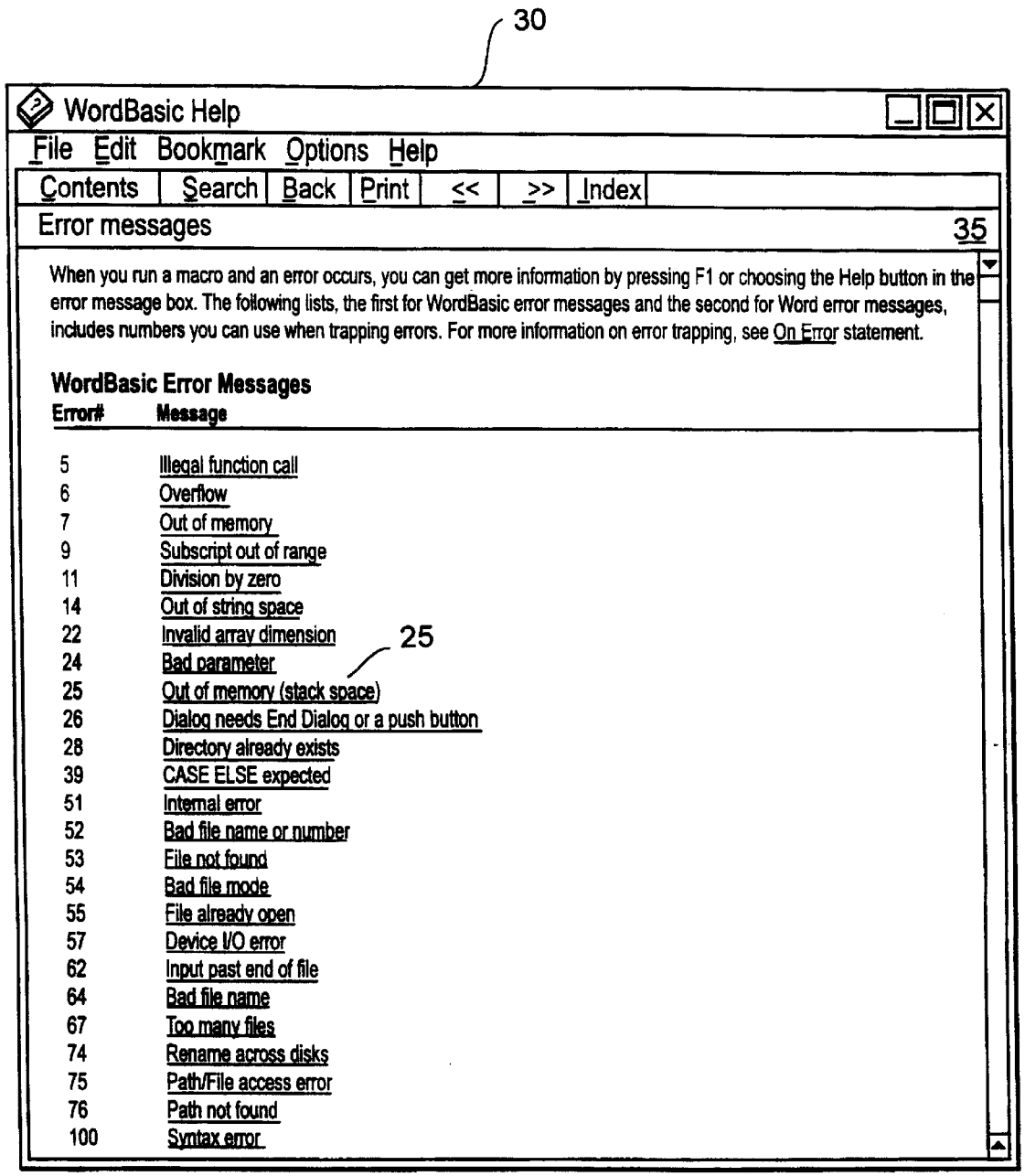
Figure 3D:
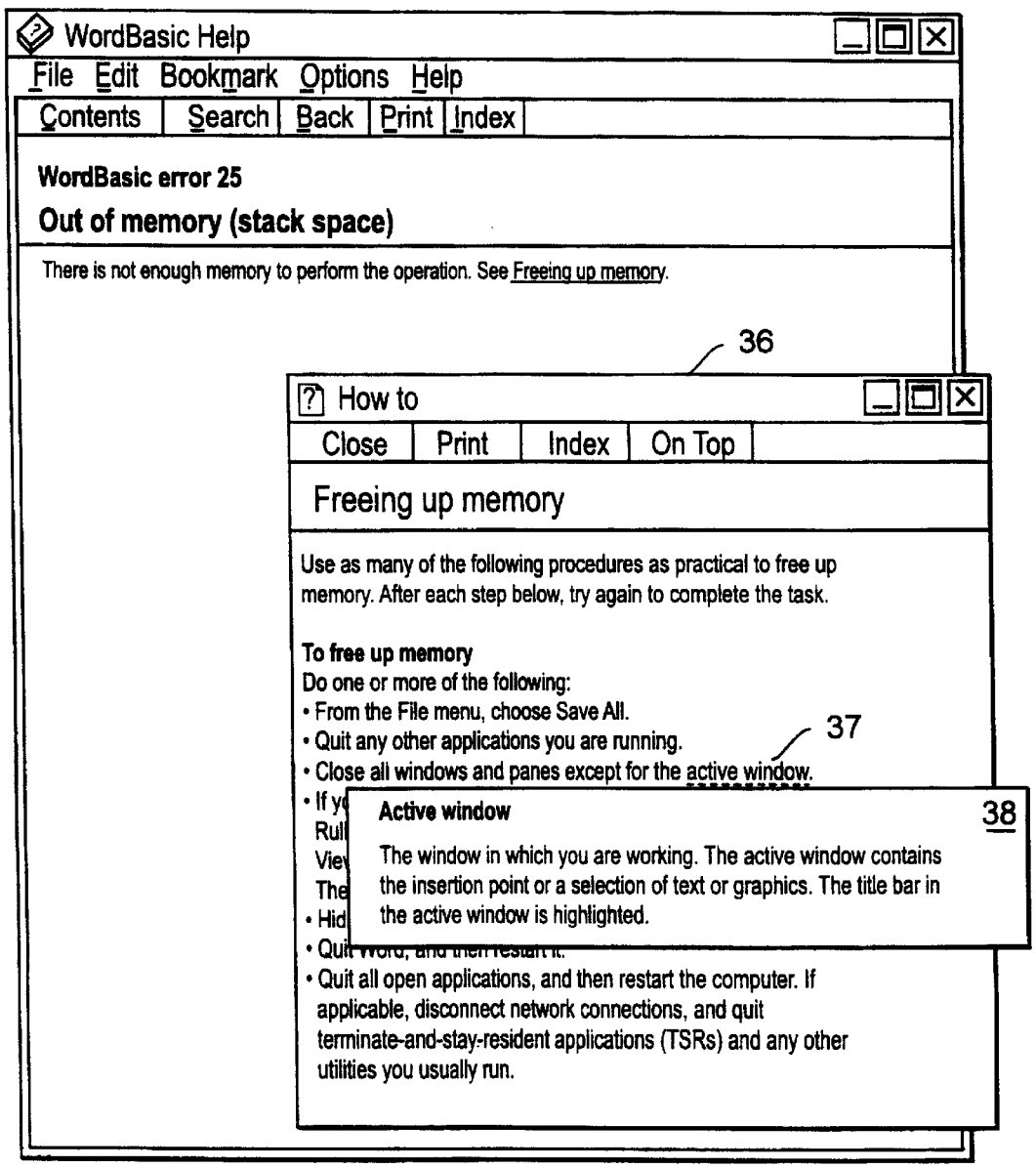
Figure 4:
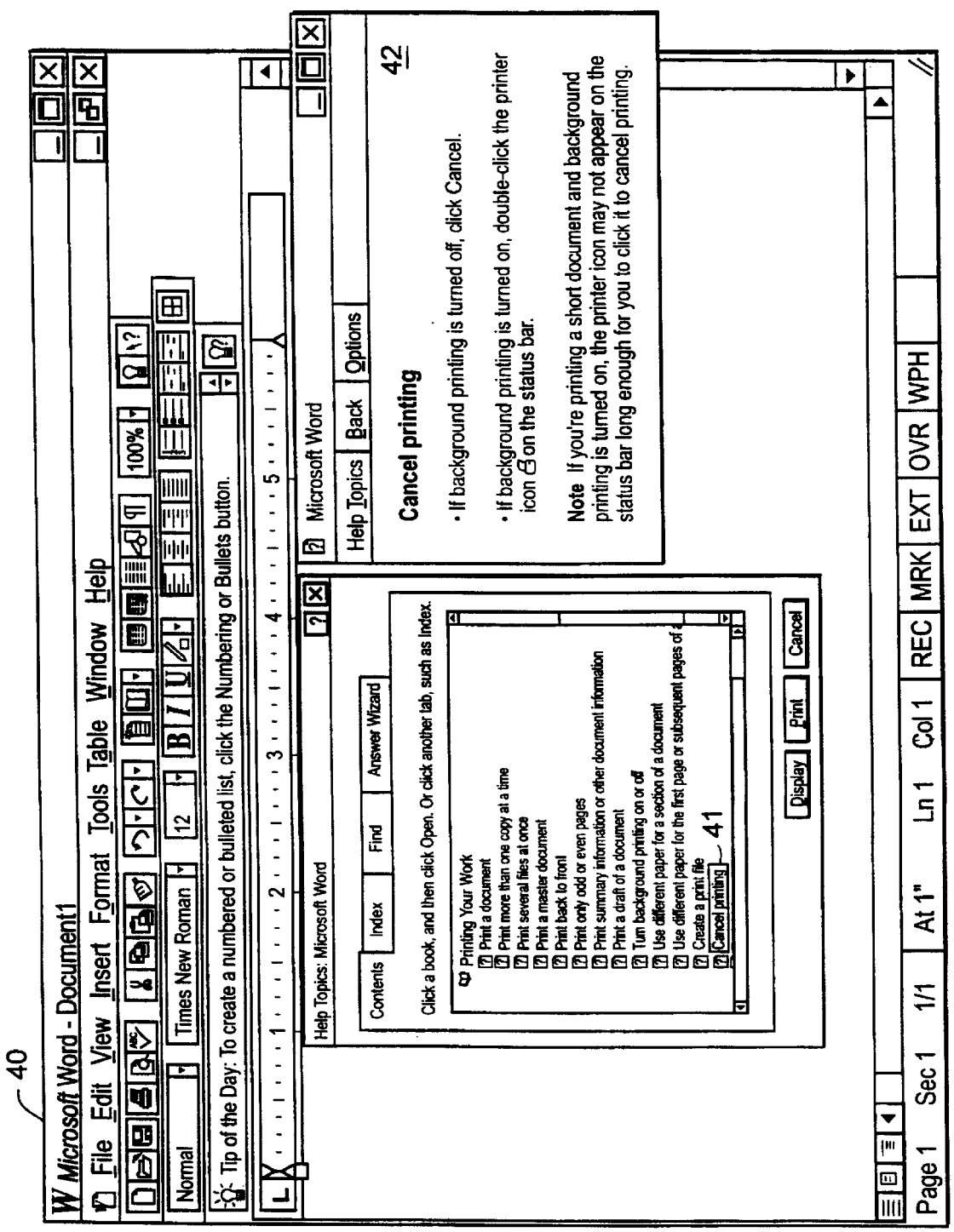
Figure 5A:
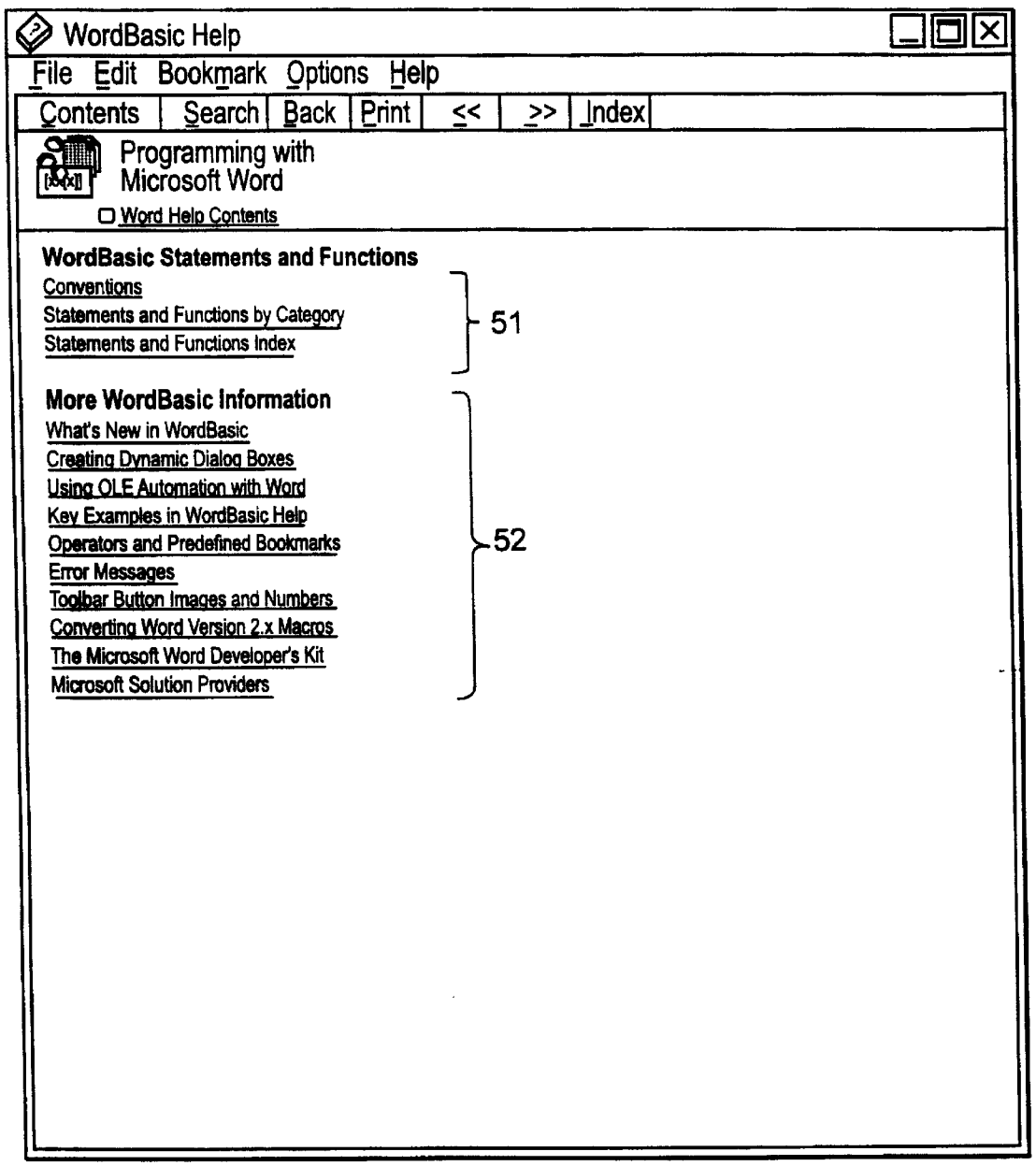
Figure 5C:
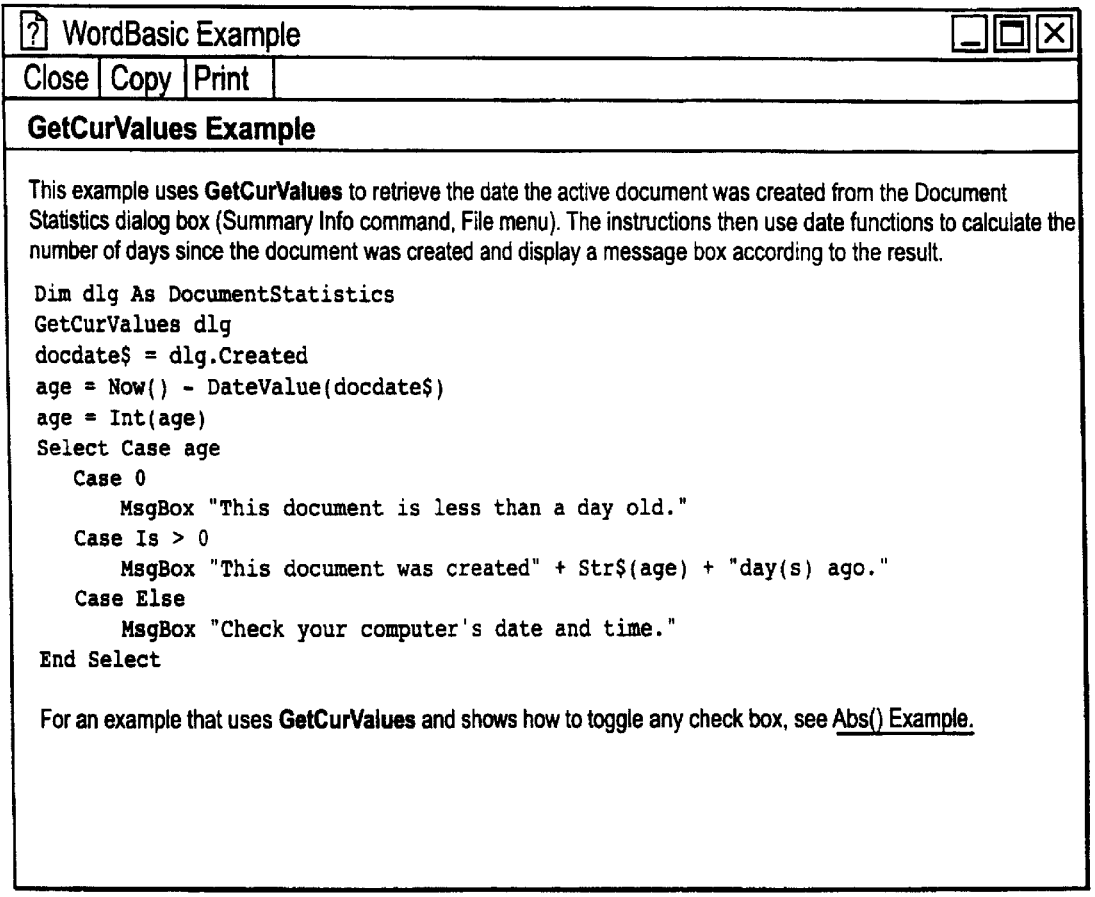
Figure 6:
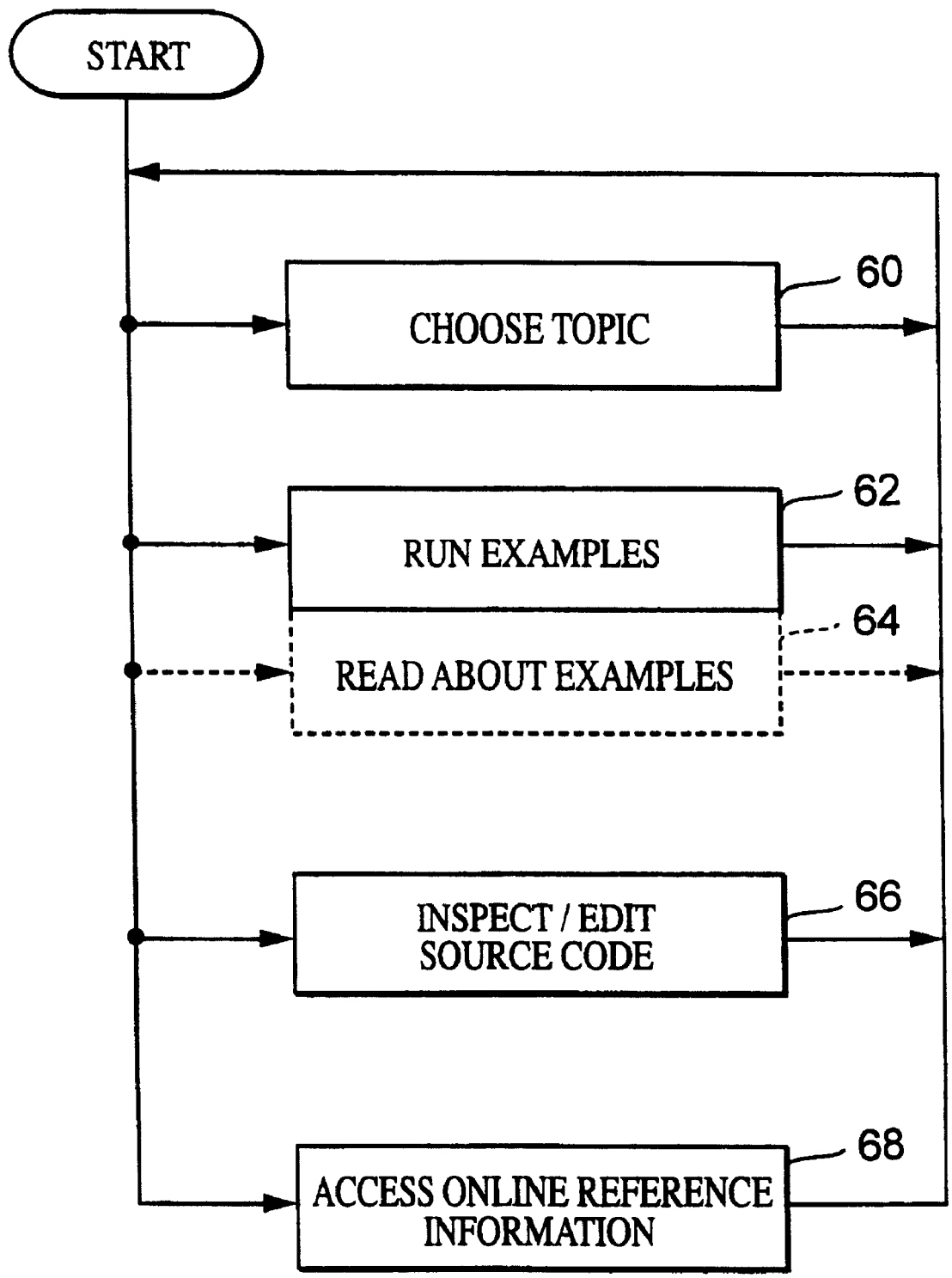
FIG. 6 is a flow diagram showing the options available to a user of the Informix® by Example application.

As illustrated in the flow diagram of FIG. 6, an Informix® by Example user has several different options for obtaining information including selecting among various different topics (step 60); running examples while the application for which help is sought remains active (step 62); reading about the examples, either concurrently while running the example or independent of the example (step 64); inspecting the examples' source code in different editor utilities (step 66); and accessing online background reference materials that help the user to understand the examples (step 68)—all without leaving the help environment. While in step 66, the source code for the examples can be used as sample program code which can be cut-and-pasted for use as a template in the NewEra™ development environment in creating new applications. Moreover, Informix® by Example enables users to learn through experimentation, e.g., by selectively changing the examples or their parameters and observing how the changes affect the examples' outcomes.

Specific features of Informix® by Example are described in detail with reference to FIGS. 7–16E, which are exemplary screen shots taken from the Informix® by Example application.

When a user first launches Informix® by Example, the default screen configuration shown in FIG. 7 is displayed. This initial screen includes two separate display windows, a list (or "table-of-contents") window 70 showing the subtopics presently available to the user under the current topic 73, and a text window 71 which displays the help information corresponding to the topic or subtopic selected from the list window 70. As the user clicks different ones of the eight subtopics 72 displayed in the list window 70, the information in the text window 71 is updated automatically to correspond to the chosen subtopic 72. The user can move to different pages within the current topic by clicking the forward (">>") button 76 or the backward ("<<") button 75 as desired.

Figure 8:
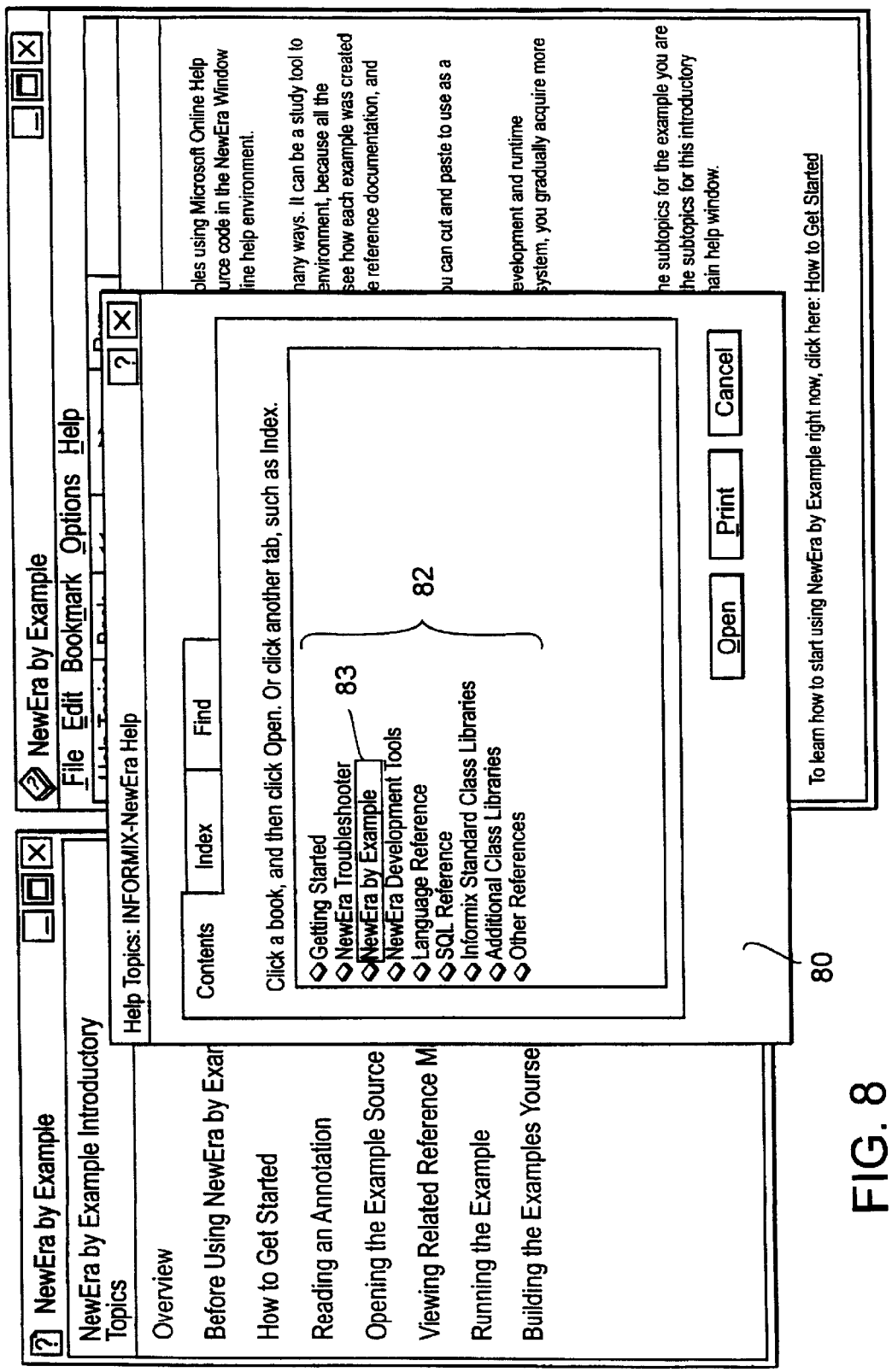

In the example of FIG. 7, the subtopics shown in the list window 71 relate to the topic "NewEra™ by Example Introductory Topics." To switch to another help topic, and thereby make available a different subset of the online help documentation, the user clicks the Help Topics button 74 which brings up a window containing the Help Topics menu 80 with a list 82 of nine different help topics, as shown in FIG. 8. At any point in the Informix® by Example application, the user can jump to any other portion of the online help system by bringing up the Help Topics menu 80 and clicking the desired topic. The user can return to a previous topic by pressing the Back button 77 an appropriate number of times.

Figure 9:
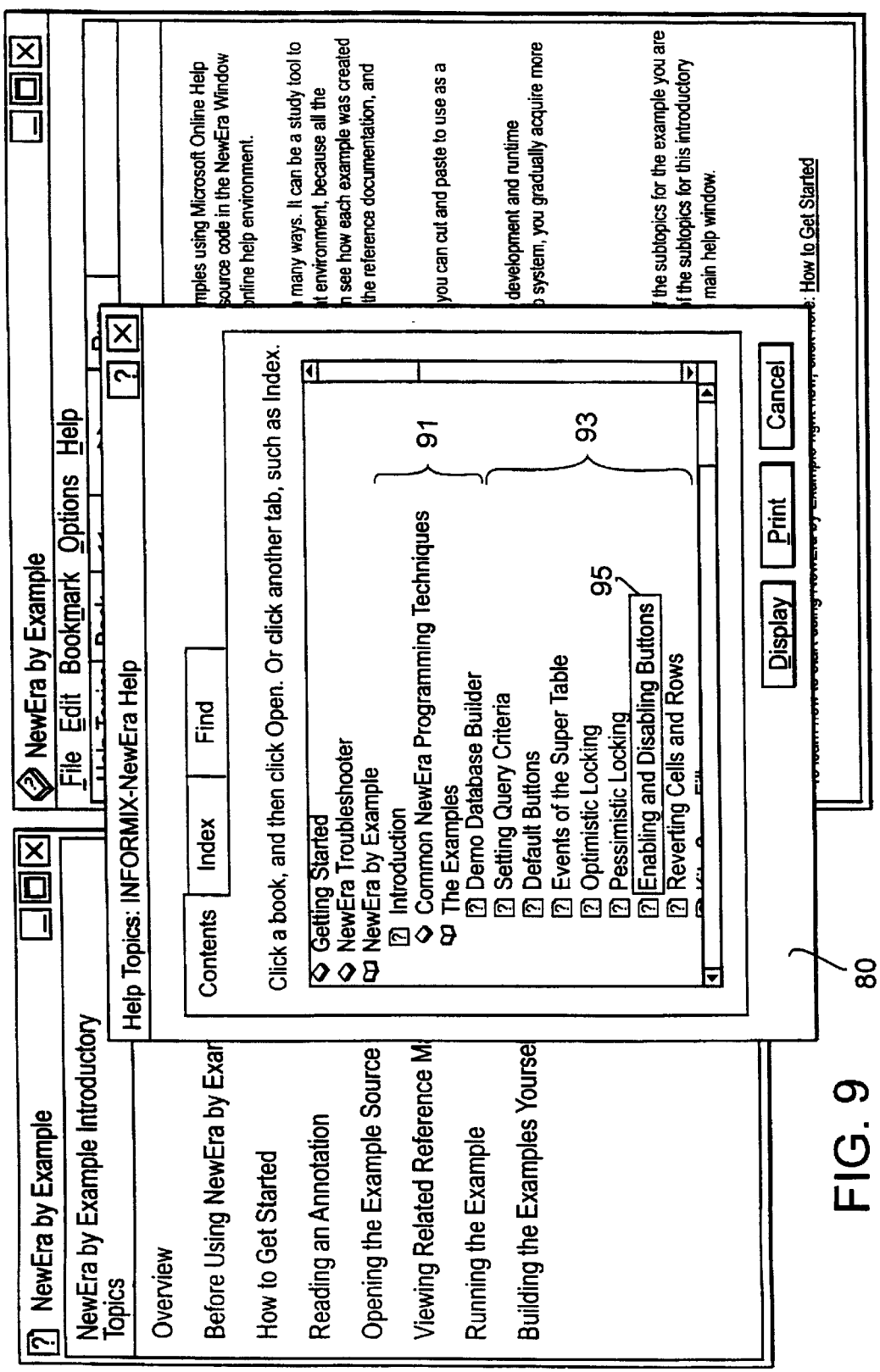

Each of the help topics in the list 82 in FIG. 8 can be expanded to reveal a hierarchy of multiple levels of subtopics. When the user clicks, for example, on topic 83 ("NewEra™ by Example"), it expands to reveal two additional levels of subtopics as shown in FIG. 9—a first level 91 including the subtopics "Introduction," "Common NewEra™ Programming Techniques," and "The Examples," and a second level 93 under "The Examples" subtopic which includes the 43 interactive examples.

When the user clicks one of the examples, e.g., the "Enabling and Disabling Buttons" example 95, the list window 70 is updated as shown in FIG. 10 to display the annotation segments 101 ("Overview of Buttons2 Example," "Graphical Object Summary," "Event Handler Summary," "Important Event Handlers," and "Enhancements and Variations") associated with the selected example. The annotation segments 101 collectively describe the corresponding example and include descriptions of the example's window, its graphical objects, and its event handlers. In addition to the prose descriptions of the example, an annotation segment usually also includes a source code fragment of particular interest which has been imported directly from the source code of the example under consideration.

As shown in FIG. 10, one of the annotation segments ("Important Event Handlers") includes 13 topics 104—a list of the primary event handlers used in the BUTTONS2 example. Each event handler topic 104 includes source code fragments and prose explanations describing the event handler to which the topic corresponds. For example, when the user clicks event handler topic 105, the text window 71 displays source code fragments 111 relating to the corresponding event handler (nextBT :: activate( )) along with annotations 112 describing the code's operation, as shown in FIG. 11.

The text window also may contain one or more links to related information, for example, background reference material, which in turn may include still further links to additional background information and so on in hierarchical fashion, each successive level in the hierarchy providing information about the example in greater detail and at a lower level of abstraction. By providing a hierarchy of links to increasingly detailed documentation in this manner, Informix® by Example supplies context-appropriate information in a helpful and efficient manner to all users, regardless of their varying levels of experience and sophistication. A user can traverse down the hierarchical links of descriptive information selectively until a level of understanding is reached that is commensurate with the user's needs and background. This arrangement provides novice users with easy access to detailed descriptive information while, at the same time, experienced users seeking help on a specific point are protected from having to navigate through large volumes of unneeded information.

Figure 12:
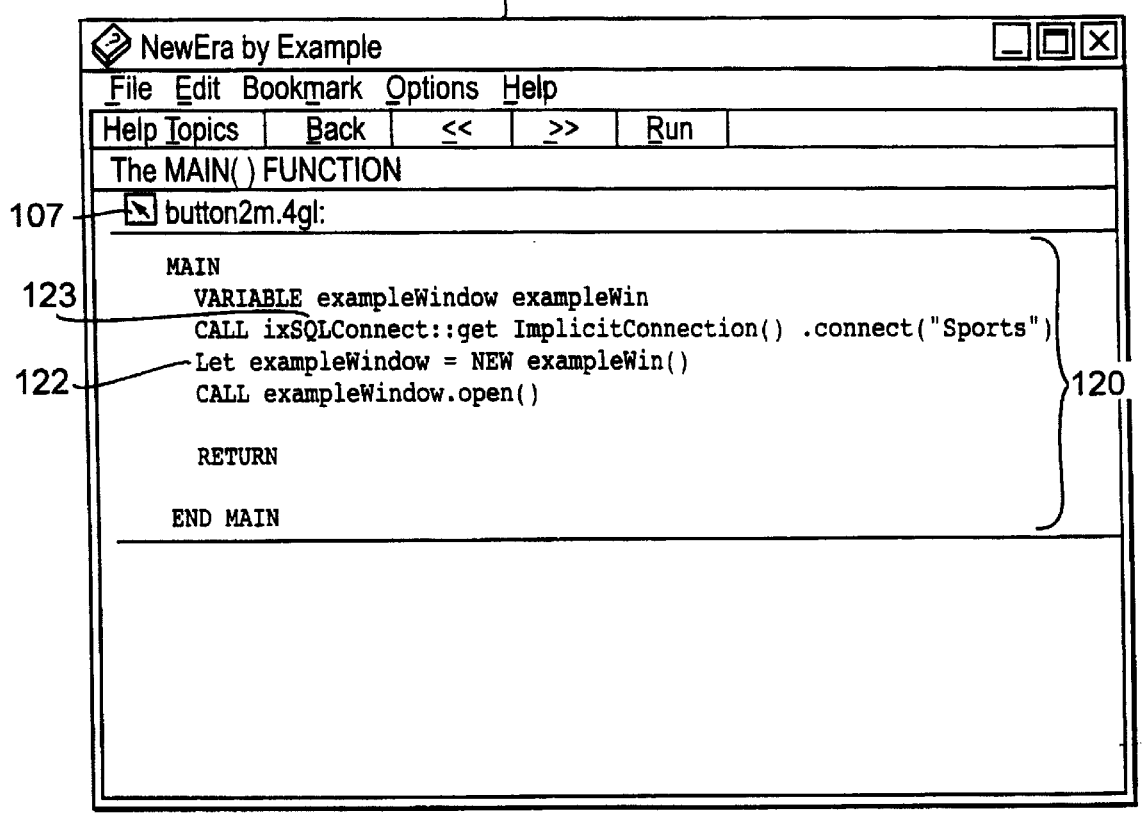
Figure 13A:
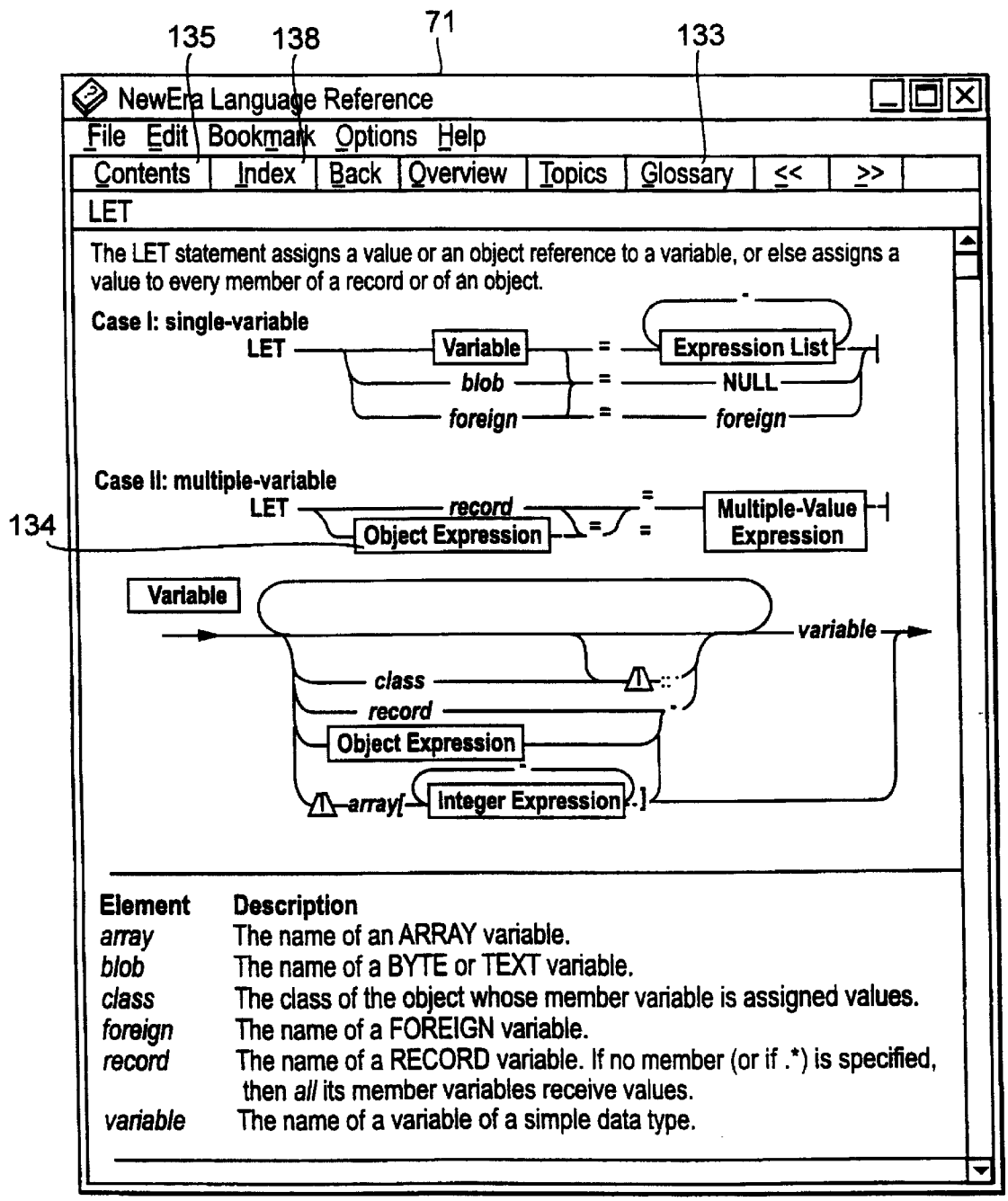
Figure 13B:
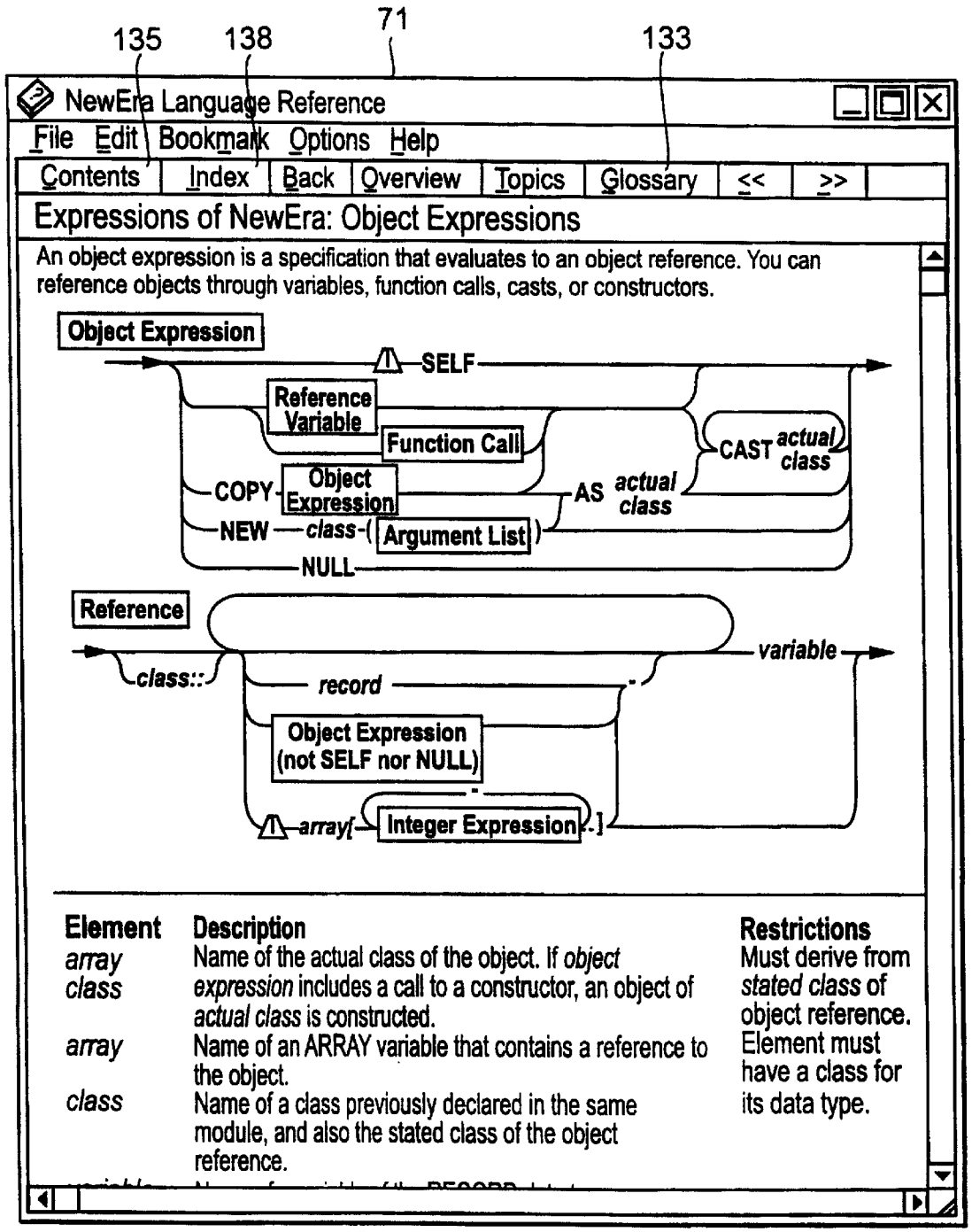
Figure 13C:
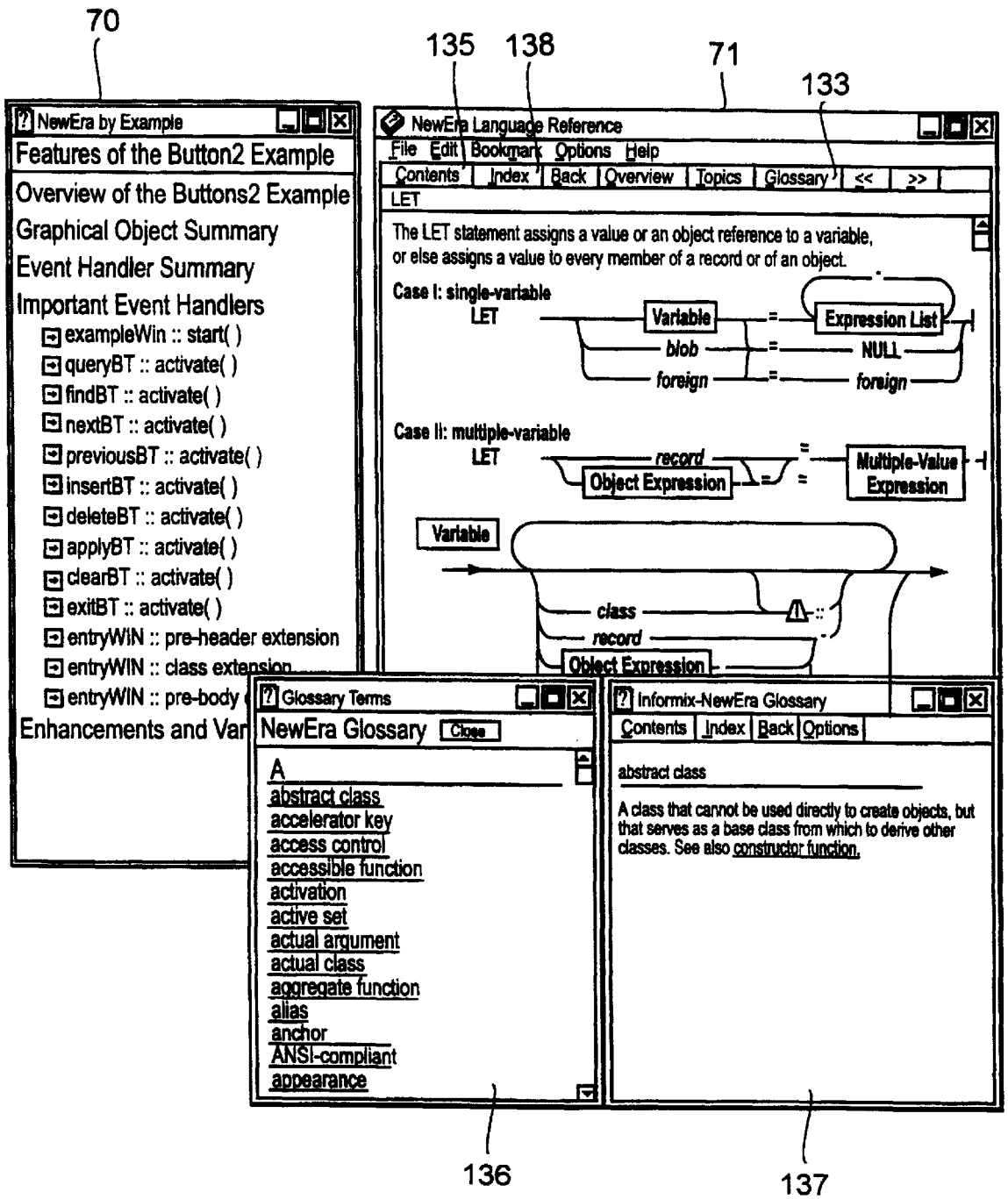

An example of hierarchical linking is shown in FIG. 10 in which text window 71 includes a link 106 (displayed as green, underlined text) to the MAIN( ) function, one of functions in the BUTTONS2 example. When the user clicks the MAIN( ) function link 106, the text window 71 displays the source code 120 for that function, as shown in FIG. 12. The source code 120 includes further links to related information such as an online language reference manual containing descriptions of keywords and object classes. When the user clicks one of these links—for example, the keyword link 122 for the LET statement—the text window 71 changes to display the corresponding online language reference entry as shown in FIG. 13A. Similarly, if the user had clicked the object class link 123, the text window 71 would have displayed information about the ixSQLConnect class. In FIG. 13A, the user can follow links to still further background information, for example, by clicking the Object Expression box 134 to cause the text window 71 to appear as in FIG. 13B. Subsequently, or alternatively, the user can click the Glossary button 133 to bring up an online glossary in a pair of windows—a glossary table of contents window 136 and a glossary text window 137—as shown in FIG. 13C. Clicking a term in the glossary table of contents window 136 causes its definition to appear in the glossary text window 137.

After studying an example's annotation, its source code fragments, corresponding language reference entries, the glossary, or a combination thereof, the user can jump selectively to any other location in the help system by clicking the Contents button 135, which brings up the Help Topics menu 80 shown in FIG. 8 (or the Index button 138, which presents the available help topics in a searchable-indexed form), and then selecting the desired topic in the manner described in connection with FIGS. 8 and 9.

Keyword links and class name links, such as the LET statement link 122 and the ixSQLConnect class link 123, respectively, in FIG. 12 are represented in visually unique manners (e.g., blue uppercase text for keywords, blue upper and lowercase text for class names) so that they may be distinguished easily from each other and from other types of links such as the MAIN( ) function link 106 in FIG. 10 (green, underlined text). By using different styles for different types of links, Informix® by Example provides the user with intuitive and useful information concerning the nature of the online information available and the interrelationships between the different components (annotations, source code fragments, language references, etc.) of the examples. Virtually any number of different link types may be represented by different styles according to the preferences of the system designer.

For each of the source code fragments included in an example's annotation, a user can invoke an appropriate editing utility from within Informix® by Example to inspect, edit or copy the example's source code. This allows users to view a source code fragment in the context of the larger program from which it was taken.

Figure 14:
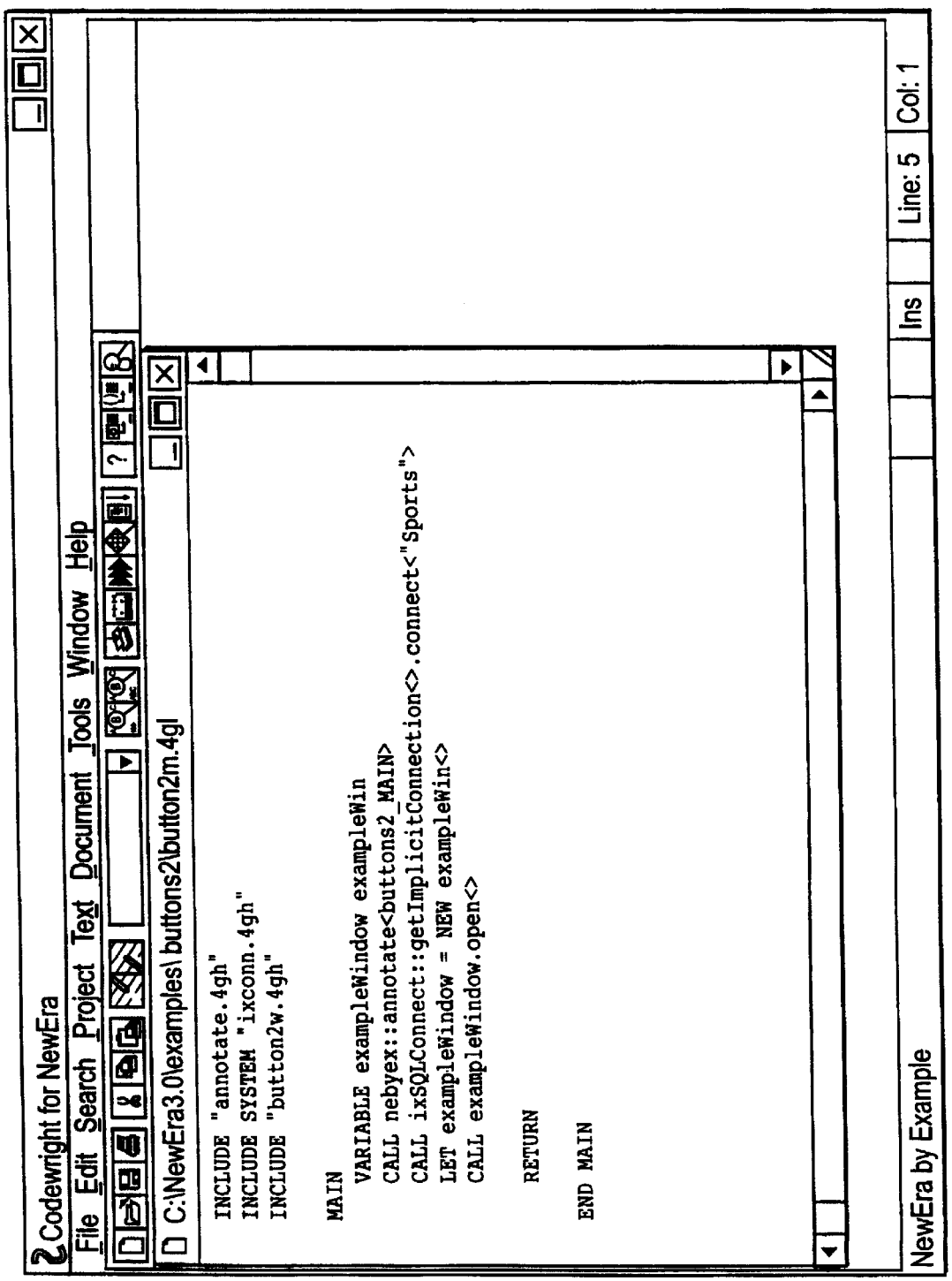
Figure 15:
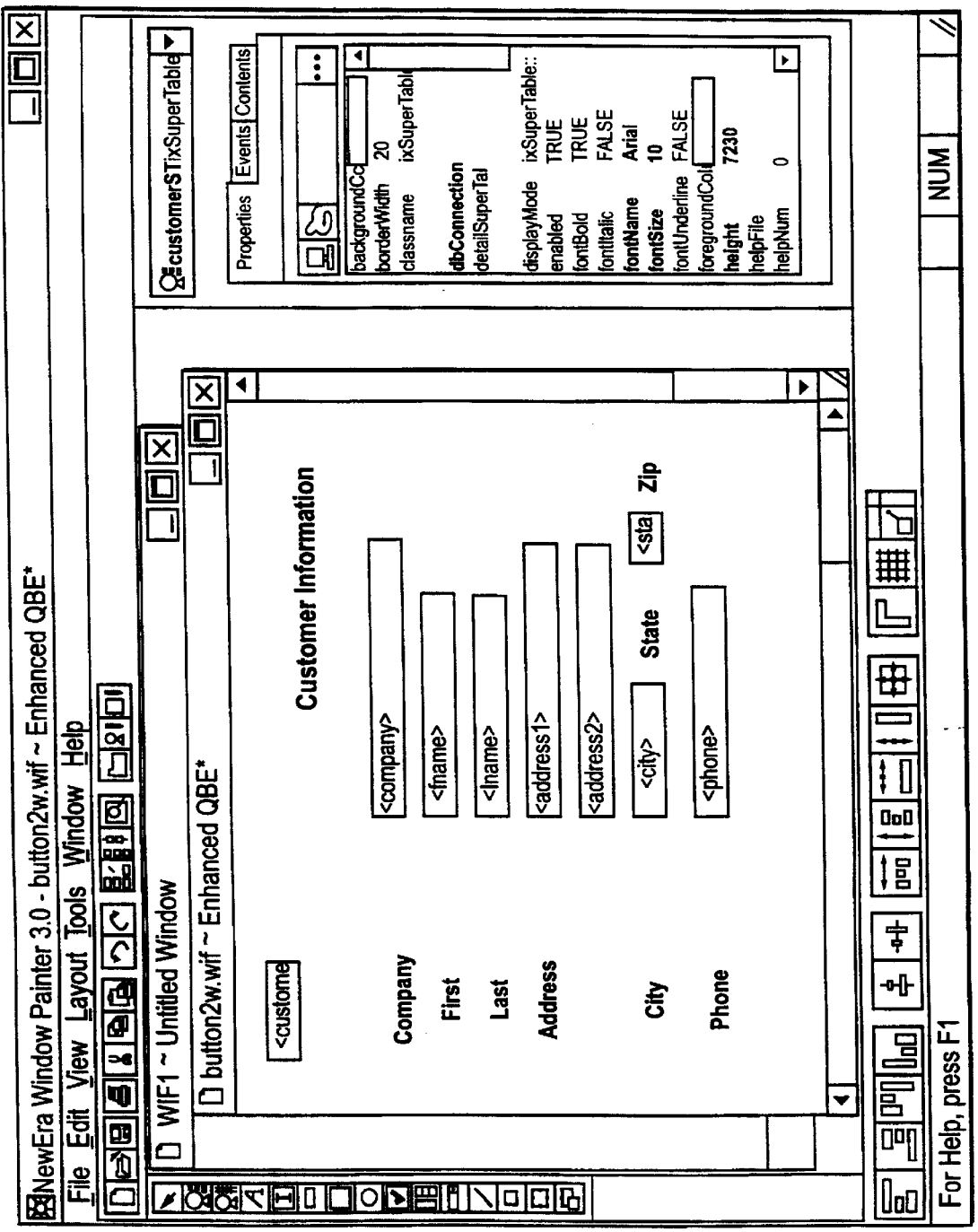

Informix® by Example includes source code fragments from two different types of source code—textual program code in the NewEra™ programming language (as indicated by a 4GL or 4GH file suffix), and windows interface definition files (files having the suffix WIF) which define how the GUI will appear to, and interact with, the end-user of the application undergoing development. To view either type of source code fragment, the user clicks a short-cut arrow next to a code fragment, for example, one of the short-cut arrows 107 and 108 shown in FIGS. 10–12, and Informix® by Example responds by launching an editor that corresponds to the type of source code under consideration. When the user clicks a short-cut arrow next to a 4GH or 4GL file, such as short-cut arrow 107 in FIGS. 10 and 12, Informix® by Example automatically launches the appropriate editor—NewEra™ Codewright—to view the source code file from which the code fragment was taken, as shown in FIG. 14. Similarly, when the user clicks a short-cut arrow next to a WIF file, such as short-cut arrow 108 in FIGS. 10 and 11, Informix® by Example automatically launches the appropriate editor—NewEra™ Window Painter 3.0—to view the WIF file from which the code fragment was taken, as shown in FIG. 15.

Selectively launching an appropriate one of multiple different editors in this manner reflects the standard editing behavior of the NewEra™ development environment. Both the NewEra™ development environment and the Informix® by Example documentation system make use of the same editors in the same manner. As a result, users gain familiarity with the application for which help is sought (i.e., the NewEra™ development environment) through normal interaction with the online help system (i.e., Informix® by Example).

Once the user has opened up the source code for an example, the user simply can study the code or can cut-andpaste portions of the code, whether visual objects from a WIF file or program statements in a 4GH or 4GL file, into the user's own source files. Alternatively, the user can perform a "Save As . . . " operation and thereby save the source code for the example under a new file name. The user then can edit or otherwise manipulate the new file as desired. In this manner, the examples provided by Informix® by Example can serve as templates for use in developing new applications in the NewEra™ development environment.

Users also may execute any or all of the 43 interactive examples provided with Informix® by Example to observe first hand how they operate. The examples are prebuilt and can be launched directly from their corresponding Informix® by Example annotations. To do so, a user first selects an example of interest from the Help Topics window 80 shown in FIG. 9 and, when the corresponding annotation appears in the text window, clicks the Run button appearing near the top of the text window. In response, the example executes and, based on the input received from the user, displays various screens to the user as if the example were a standalone application. At the same time, the text window automatically updates to display descriptive information that is pertinent to the portion of the example that was just executed by the user. With each successive operation that the user performs on the running example, the text window is updated simultaneously (or nearly so) to maintain synchronization with the state of the interactive example by displaying corresponding sections of the annotations which explain to the user what just happened in the example. By coordinating the help display with the current state of the examples, users consistently are provided with timely and useful information (e.g., the particular source code being executed by the example) that is directly relevant to the user's current topic of interest. As a result, the user's ability to comprehend and absorb information is enhanced dramatically. An example of Informix® by Example's automatically coordinated help display is illustrated in FIGS. 16A–16E.

Figure 16B:
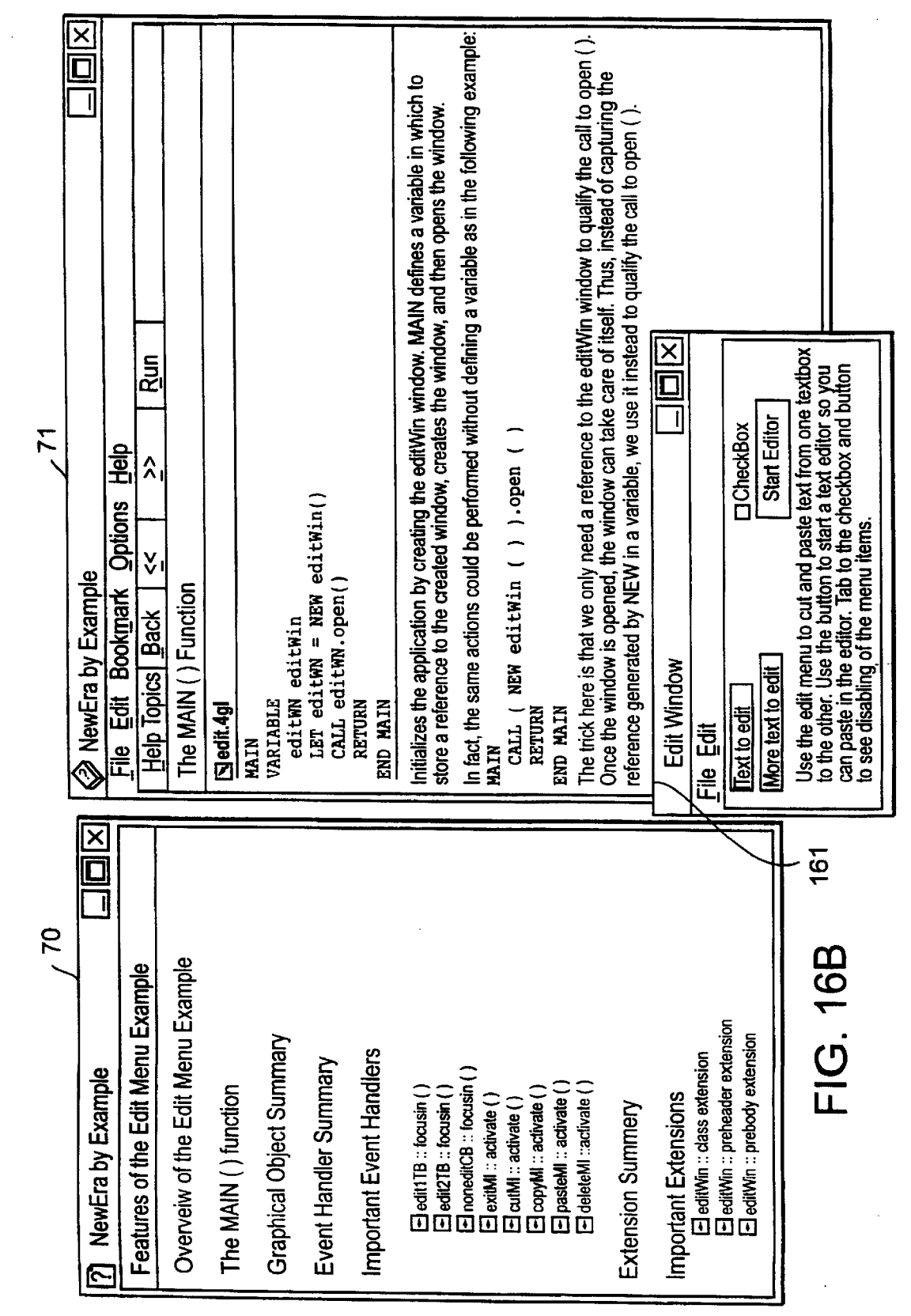

FIG. 16A shows the initial list window 70 and text window 71 that are displayed when the user selects the "Displaying an Edit Menu" example from the Help Topics menu. To run this example, the user clicks the Run button 160 which, as shown in FIG. 16B, spawns an example window 161 illustrating the basics of an edit window. At the same time, the text window 71 is updated to display information on the MAIN( ) function for the "Displaying an Edit Window" example.

Figure 16E:
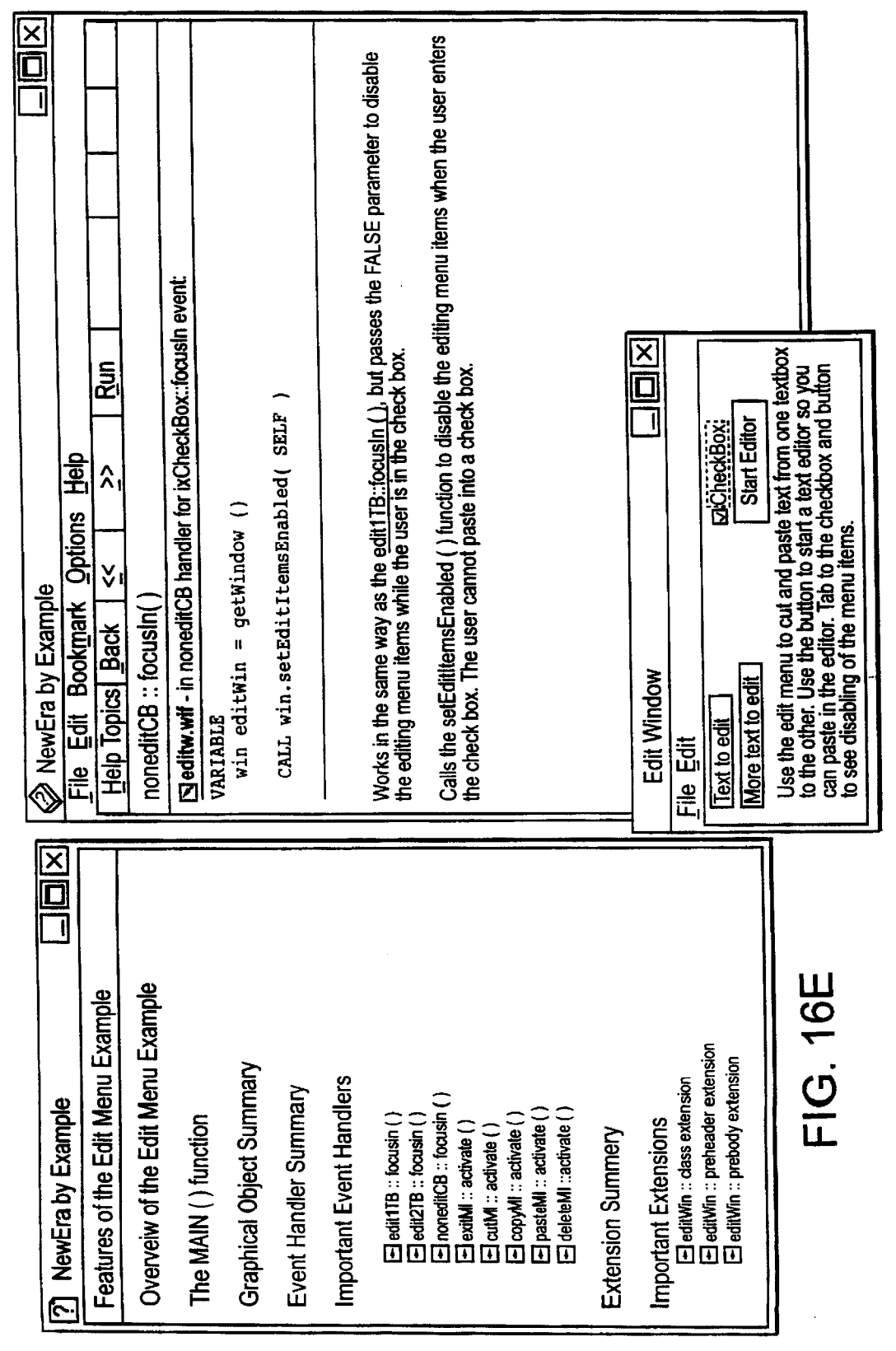

As the user selectively manipulates the GUI controls in the example window 161, the information displayed in the text window 71 is updated automatically in a corresponding manner. In FIG. 16C, the user has clicked in text box 162 which causes the text window 71 to display information relating to edit1TB :: focusIn( ). Similarly, when the user clicks text box 163, text window 71 displays information relating to edit2TB :: focusIn( ) as shown in FIG. 16D. When the user clicks the CheckBox 164, text window 71 displays information relating to noneditCB :: focusIn( ) as shown in FIG. 16E.

Users can experiment with an example by changing its source code or modifying its parameters and observing how these changes affect the example. To do so, the user edits the desired source code file, saves it a separate working directory so as not to disturb the predefined examples, and then rebuilds the example using mechanisms provided with the NewEra™ development environment. The number and types of such experiments that can be created and performed are limited only by the imagination of the user.

Other options in running the examples are possible. For example, users can run an example without concurrently viewing annotations. Additionally, the Debugger provided with NewEra™ can be used to set breakpoints in the example source code before running the example, thereby giving the user even further insight into how an example works.

Figure 17:
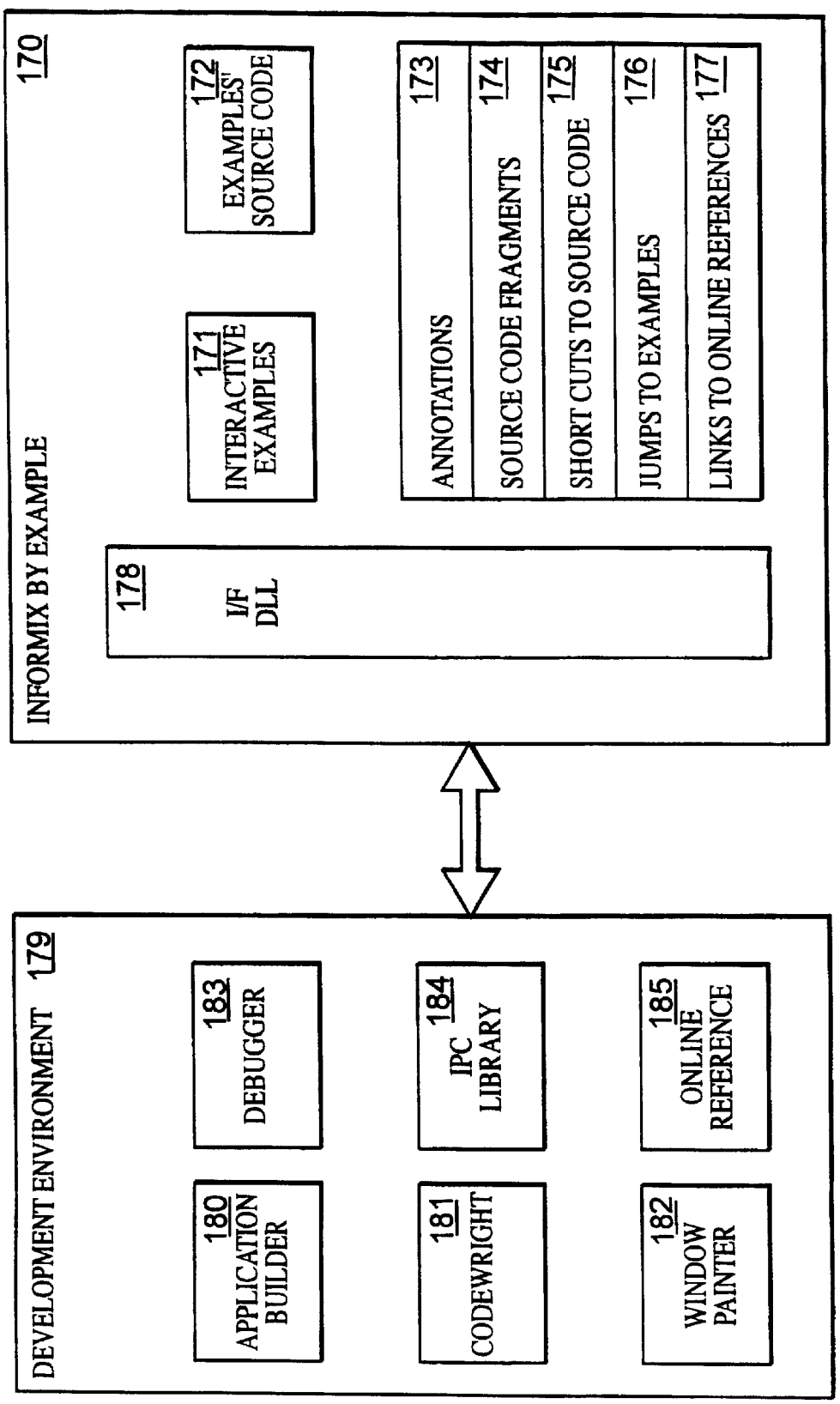
FIG. 17 is a block diagram of the NewEra™ architecture.
Figure 18:
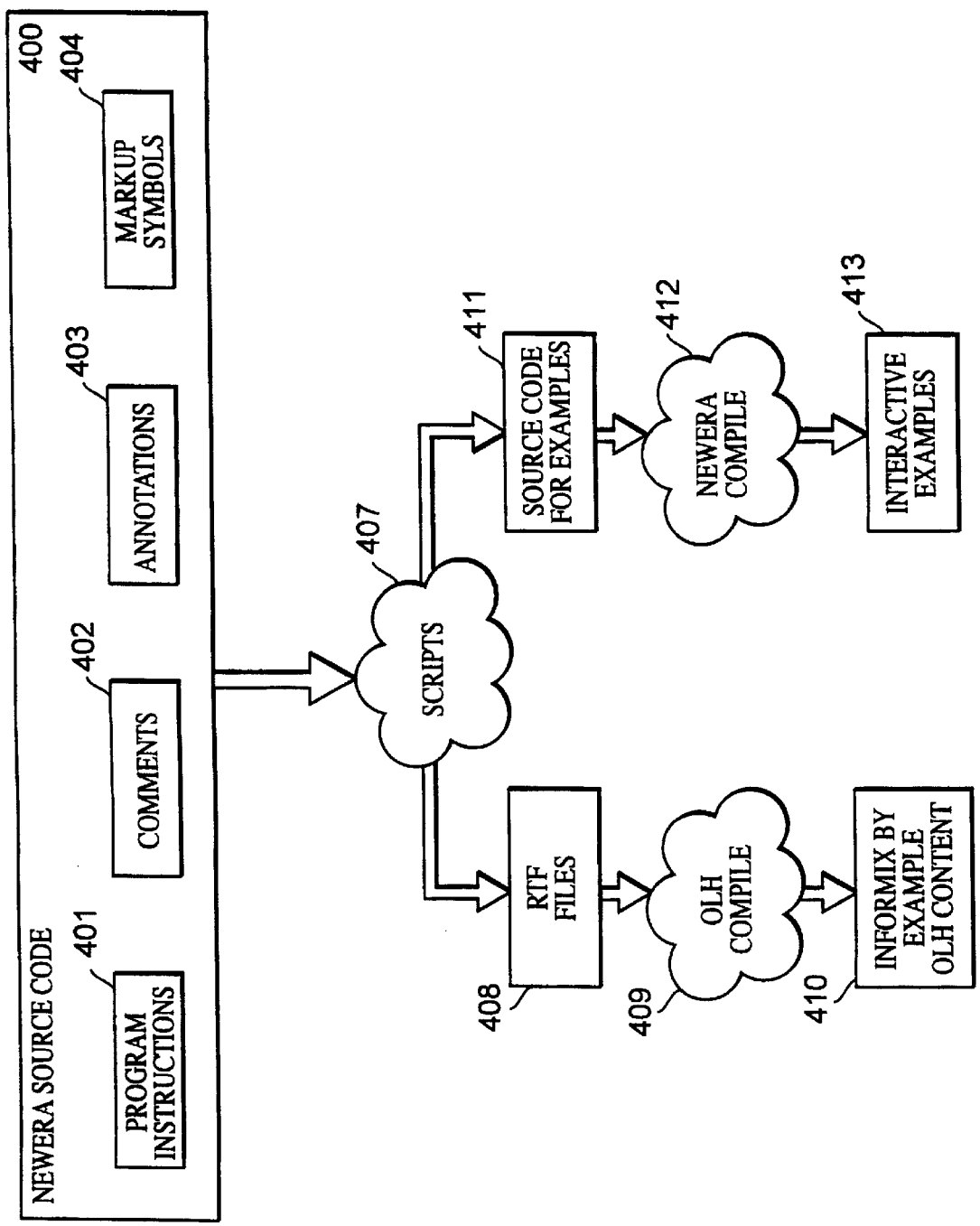
FIG. 18 is a block diagram showing how the Informix® by Example application is built.

A description of the Informix® by Example architecture, and the manner in which the NewEra™ development environment and the Informix® by Example application are built, is provided with reference to FIGS. 17–19.

Informix® by Example builds upon the Online Help (OLH) facility provided with the Windows 95/NT operating systems. As shown in FIG. 17, the Informix® by Example application 170 draws both upon resources created specifically for Informix® by Example as well as resources that are native to the NewEra™ development environment 179. The components specific to the Informix® by Example application 170 include the interactive examples 171, source code 172 for the examples, and annotations 173 describing the examples. The annotations 173 include several different subcomponents including representative fragments 174 of the examples' source code, short-cuts 175 that launch an appropriate editor (e.g., NewEra™ Codewright or NewEra™ Window Painter) for viewing the examples' source code, jumps 176 to the interactive examples, and links 177 to descriptions of specified keywords and class names contained in the NewEra™ online reference 185.

As indicated in FIG. 17, the online reference 185, the Codewright editor 181 and the Window Painter editor 182—along with other components such as Application Builder 180, Debugger 183 and Interprocess Communications (IPC) library 184—exist as part of the development environment 179 and thus are logically separated from the Informix® by Example application 170. Consequently, when a user of the it Informix® by Example application 170 requests a resource residing in the NewEra™ development environment—either by clicking a link 177 for a keyword or class name or by clicking a shortcut 175 to view source code—Informix® by Example 170 first must communicate with the NewEra™ development environment 179 via an interface dynamic linked library (DLL) 178 to access the requested resources. The interface DLL 178 is a compiled library of routines that enable the Informix® by Example application 170 to communicate with other applications such as the components of the development environment. Informix® by Example 170 calls the appropriate DLL routines to display the requested online reference information or to launch the appropriate source code editor, depending on the nature of the request made by the user.

More specifically, when an Informix® by Example user clicks on a shortcut 175 to a location in an example's source code 172, the Informix® by Example application 170 calls a function in the DLL, which in turn calls a function in the IPC library 184 which launches the appropriate editor. As part of this function call (which is generated automatically by processing source code fragments during the build of Informix® by Example, discussed below), the Informix® by Example application 170 passes parameters that designate the editor to be launched (Codewright 181 or Window Painter 182), and that identify the line number at which the examples' source code 172 is to be opened by the designated editor. When an Informix® by Example user clicks on a link 175 for a keyword or class name, the Informix® by Example application 170 calls a function in the DLL, which in turn uses the Windows OLH facility to display the corresponding definition in the online reference 185.

Other functions provided by the interface DLL 178 control execution of the interactive examples 171 and coordinate the list window and the text window displays to ensure that they maintain correspondence. Further details on the interface DLL 178 and the runtime operation of the Informix® by Example application 170 are set forth in Appendix B.

The manner in which the Informix® by Example application 170 and its components (e.g., examples 171, examples' source code 172 and annotations 173) are generated realizes a high degree of code "maintainability"—a measure of the efficiency and ease with which an application can be modified. The high degree of code maintainability is achieved by incorporating all of the information used to generate both the interactive examples and the corresponding annotative components of Informix® by Example into a unified logical entity—namely, the source code for the interactive examples themselves. As a result, only one central source of information need be maintained. Any changes or updates made to that central information source will be incorporated automatically both into the examples and into the documentation/instruction/help facility (Informix® by Example) for the examples. This automated build procedure ensures that the examples and the corresponding Informix® by Example annotations are kept in synchronization regardless of the number and frequency of modifications made to the underlying source code.

As shown in FIG. 18, the NewEra™ by Example source code 400 can be thought of as a single logical entity, although physically it is formed of a collection of interdependent files. The source code 400 contains three basic types of text—program instructions 401, program comments 402 and annotations 403—intermixed throughout the source code. The different text types are distinguished from each other by programming conventions and by strategically placing various different markup symbols 404 throughout the source code.

Some of the text in the source code 400 can serve multiple purposes. For example, the program instructions 401 in the source code 400 are compiled into the examples' binary executable files 413. These program instructions include calls to the OLH facility to display the corresponding annotation at the appropriate point during execution of the example. When an example is run by the end-user, these OLH calls cause the text window to display the appropriate annotation automatically to describe what just happened in the example.

Portions of these same program instructions 401 also will be extracted to serve as a clean copy of the examples' source code, which can be displayed to the user in an editing environment. Similarly, descriptive text that serves as program comments 402 (unprocessed programming explanations directed at the Informix® by Example project developers) also can serve as annotations 403 (programming explanations displayed to end-users of Informix® by Example at runtime).

The markup symbols 404 delineate the various types of text in the source code and specify how they are to be handled when the interactive examples and the Informix® by Example annotations are built. FIG. 19 shows a sample of NewEra™ source code which includes several markup symbols including two instances of the ".normal" symbol 190 and 191, an ".[edit" symbol 192 and a ".]file" symbol 193. Each of these markup symbols, along with their respective arguments, are bounded by a pair of brackets ("{ . . . }")indicating that they reside in comment fields and are not to be treated as NewEra™ program instructions. Programming languages other than NewEra™ may use different conventions to delineate comment fields. In the Java programming language, for example, a start of a comment field is designated by a "/*" symbol and terminated by a "*/"symbol. In any event, the corresponding programming language compiler will ignore any text that has been designated as residing in a comment field.

The ".normal" markup symbol indicates that the text following that symbol (e.g., "Since objects, . . . ," following symbol 190) is to be treated as explanatory comments, and thus to be displayed to the end-user in a text window as part of the annotation text at an appropriate point during execution of a corresponding interactive example. Other markup symbols specify the name of output files, portions of the source code that are to serve as representative fragments of the examples' source code, hotspots and destinations for jumps and links, or GUI-related information concerning display characteristics and objects (windows, popups, buttons, etc.). A detailed description of the markup language is set forth in Appendix C.

Once the source code 400 has been modified as desired, it is used to build the interactive examples and the descriptive content of the Informix® by Example application through a number of different steps. First, the source code 400 is processed by two different scripts 407—a PERL script (Practical Extraction and Report Language, a general purpose interpreted language often used for parsing text) and a WordBasic script. The scripts 407 generate two basic types of output: source code files 411 for the interactive examples, and RTF files 408 (Rich Text Format, the format expected by the OLH compiler) which represent the descriptive and visual content (e.g., annotations, source code fragments, shortcuts to source code editors, links to online reference, jumps to executable examples) of the Informix® by Example application.

The PERL script parses the source code 400 searching for markup symbols and, based on the particular markup symbols encountered, produces several RTF file fragments and several source code files 411, which represent various subsets of the overall source code 400. The WordBasic Script then merges the RTF file fragments into complete RTF files 408 which are processed by the Windows OLH compiler 409 to produce OLH files 410 containing the descriptive and visual content for the Informix® by Example application. At the same time, the examples' source code 411 is compiled by the NewEra™ compiler to generate the binary executable corresponding to the interactive examples 413.

The RTF file fragments generated by PERL script contain several different components in addition to the annotations 403 appearing in the source code 400. The PERL script identifies each instance of a keyword or a class name appearing in the source code extracted for the examples. For each keyword and class name detected, the PERL script creates a link in the RTF file to the corresponding entry in the online reference materials.

The PERL script also extracts fragments of representative source code for inclusion in the RTF files as text that appears along with the explanatory comments. The source code fragments are formatted as monospace unwrapped text delineated by leading and trailing blank lines whereas the explanatory comments are formatted as proportionally spaced wrapped text. For each source code fragment included in the RTF file, the PERL script also inserts in the RTF file a corresponding short-cut button which enables the end-user to launch the source code editors and view the source code at the line where the fragment starts. The PERL script also strips all of the markup symbols 404 from the source code extracted for the examples. This provides end-users with a clean version of the source code for viewing in the associated editor.

Other functions performed by the PERL script include automatically guaranteeing that the identifier for an annotation topic is the same in an interactive example as it is in the Windows OLH facility. That is, the PERL script reads the help topic identifiers for the Windows OLH facility and generates corresponding NewEra™ constants. The PERL script also generates modified versions of the NewEra™ makefiles (files that include computer-readable instructions for building an application) which are used to build the examples. Further details of the PERL script and its operation are set forth in Appendix B.

Although the PERL and WordBasic scripts described above operate on source code written in the NewEra™ programming language, different scripts can be used to parse other types of source code, for example, Java or Visual Basic. Generally, appropriate PERL and WordBasic scripts can be written to process virtually any type of programming language provided the programming language utilizes ASCII source code (required by PERL) and provides some sort of source code comment mechanism. Other programming language attributes that facilitate use of the Informix® by Example techniques include a mechanism for invoking the Windows OLH facility with a topic identifier (so the example can display its annotations), a mechanism for invoking the editing functions of the development environment (so the annotation can open source code files, assuming the programming language under consideration provides or requires a development environment), and an online reference in Windows OLH format (so keywords in the source code can have jumps to the online reference). Many of the Informix® by Example features described above can be implemented even if the underlying programming language lacks one or more of these other attributes, however.

PERL scripts can be modified to output files in formats other than RTF. For example, a modified PERL script can output hypertext markup language (HTML) files, which can be viewed using any available web browser (e.g., Netscape Navigator).

Other variations of documentation by example are possible. For example, the annotations describing the interactive examples could be presented in a manner other than textual. Sounds, graphical symbols, pictures, movies or any other means of communication could be used as desired. Further, the selection of which interactive examples to perform could be based on factors other than, or in addition to, designation by the user. For example, an interactive example could be launched automatically at certain points during execution of the underlying application, or at certain execution points in the help system. When the user clicks a keyword, class name or other link, an example could be launched automatically either in addition to, or instead of, displaying the textual reference information pointed to by the link.

The documentation by example methods and techniques described above are not limited to aiding users of software development systems but rather may find application as a general training and education tool for any computer-based application or utility. Moreover, the techniques described here may be implemented in hardware or software, or a combination of the two. Preferably, the techniques are implemented in computer programs executing on programmable computers that each includes a processor, a storage medium readable by the processor (including volatile and non-volatile memory and/or storage elements), and suitable input and output devices. Program code is applied to data entered using an input device to perform the functions described and to generate output information. The output information is applied to one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Other embodiments are within the scope of the following claims.

What is claimed is:

1. A method, performed on a computer system, of instructing a user, the method comprising:

generating a plurality of predefined interactive examples;

performing, in response to a user selection, one or more of the predefined interactive examples;

providing, in synchronization with the performed interactive example, explanatory information corresponding to the predefined interactive example; and receiving information from source code associated with the predefined interactive example;

wherein:

generating the predefined interactive example includes extracting the received information from source code associated with the predefined interactive example, and providing the explanatory information corresponding to the predefined interactive example includes extracting the received information from source code associated with the predefined interactive example.

2. The method of claim 1 further comprising enabling a user of the computer system to control the performance of the one or more predefined interactive examples.

3. The method of claim 1 further comprising enabling a user of the computer system to control the provision of explanatory information.

4. The method of claim 1 in which the providing comprises presenting explanatory information that explains what most recently occurred in the performed interactive example.

5. The method of claim 4 in which the providing comprises presenting the explanatory information concurrently with output from the performed interactive example.

6. The method of claim 5 in which the providing comprises displaying multiple windows on a screen of the computer system, the explanatory information being displayed in one window and the output from the performed interactive example being displayed in another window.

7. The method of claim 1 in which the providing comprises altering the explanatory information provided in response to a change in state of the performed interactive example.

8. The method of claim 1 further comprising providing a user of the computer system with access to online reference materials relating to the predefined interactive examples, the explanatory information, or both.

9. The method of claim 8 further comprising providing links in the explanatory information to the online reference materials.

10. The method of claim 9 further comprising presenting corresponding reference information when a user of the computer system selects a link.

11. The method of claim 9 in which the links in the explanatory information are arranged in a logical hierarchy, each successive level in the hierarchy providing an increased degree of detail.

12. The method of claim 1 further comprising providing a user of the computer system with access to source code associated with a predefined interactive example.

13. The method of claim 12 further comprising enabling the user to view, copy or modify source code associated with a predefined interactive example.

14. The method of claim 1 further comprising enabling a user of the computer system to modify a predefined interactive example.

15. The method of claim 14 further comprising allowing the user to iteratively modify and execute a predefined interactive example.

16. The method of claim 1 further comprising providing in the explanatory information a jump to a utility for accessing source code associated with a predefined interactive example.

17. The method of claim 16 further comprising launching the utility for accessing the source code when a user of the computer system selects the jump.

18. The method of claim 1 in which the providing comprises presenting a prose description of the performed interactive example's operation.

19. The method of claim 1 in which the providing comprises presenting a fragment of source code associated with the performed interactive example.

20. The method of claim 19 further comprising enabling a user of the computer system to view the source code fragment in a context of source code for the entire predefined interactive example.

21. A computer-based method of educating a user of a computer system, the method comprising:
  generating a plurality of predefined interactive demonstrations;
  performing one or more of the predefined interactive demonstrations relating to a selected topic;
  receiving information from source code associated with the predefined interactive demonstration;
  presenting the user with an annotation descriptive of the performed interactive demonstration in coordination with performance of the predefined interactive demonstration; and
  allowing the user to selectively explore different aspects of the performed interactive demonstration, the annotation, or both;
  wherein:
    generating the predefined interactive demonstration includes extracting the received information from source code associated with the predefined interactive demonstration, and
    presenting the annotation descriptive of the performed interactive demonstration includes extracting the received information from source code associated with the predefined interactive demonstration.

22. A computer-based instructional system comprising:
  a plurality of predefined interactive examples, each predefined interactive example being selectively executable by a user of a computer system;
  annotations describing each predefined interactive example, different annotations being provided automatically in response to and in synchronization with selective execution of a predefined interactive example; and
  a unified body of source code associated with a predefined interactive example;
  wherein:
    each predefined interactive example is built by extracting information from the unified body of source code associated with that predefined interactive example, and
    annotations describing a predefined interactive example are built by extracting information from the unified body of source code associated with the predefined interactive example.

23. The system of claim 22 further comprising a utility through which the user can access source code associated with a predefined interactive example.

24. The system of claim 23 in which the utility enables the user to view, copy or modify a predefined interactive example's source code.

25. The system of claim 22 further comprising a body of reference information selectively accessible to the user.

26. The system of claim 25 further comprising a link that provides the user with direct access to an item of information within the body of reference information.

27. The system of claim 26 in which the link is a visually indicated marker on which the user can click a cursor.

28. The system of claim 22 in which the annotations comprise textual descriptions of the predefined interactive example.

29. The system of claim 28 in which the annotations comprise fragments of source code associated with the predefined interactive example.

30. The system of claim 29 in which the annotations comprise jumps to a utility through which the user can access the complete source code associated with the predefined interactive example.

31. The system of claim 30 in which the jumps are represented visually to the user as short-cut arrows.

32. The system of claim 22 in which the annotations comprise visually indicated links to a body of reference information.

33. The system of claim 22 in which the interactive example illustrates computer programming concepts.

34. The system of claim 33 further comprising a software development environment for implementing the programming concepts illustrated by each predefined interactive example.

35. The system of claim 22 in which the unified body of source code includes markup symbols demarcating a portion of the source code to be used in building the one or more predefined interactive examples and another portion of the source code to be used in building the annotations describing each of the predefined interactive examples.

36. The system of claim 35 in which the portion of the source code to be used in building the one or more predefined interactive examples overlaps the portion of the source code to be used in building the annotations describing each of the predefined interactive examples.

37. The system of claim 22 further comprising an application for implementing concepts illustrated by the one or more predefined interactive examples.

38. The system of claim 37 in which the one or more predefined interactive examples provided by the computer-based instructional system represents a subset of the functionality provided by the application.

39. A method, performed on a computer system, of instructing a user, the method comprising:

generating a plurality of predefined instructional examples;

performing, in response to a user selection, one or more of the predefined instructional examples;

simultaneously providing explanatory information associated with each performed example;

permitting user interaction with at least one of the performed examples and the explanatory information;

maintaining synchronization between the performed example and the associated explanatory information in response to the user interaction; and receiving information from source code associated with the predefined instructional example;

wherein:

generating the predefined instructional example includes extracting the received information from source code associated with the predefined instructional example, and providing explanatory information associated with a performed example includes extracting the received information from source code associated with the predefined instructional example.

40. A method, performed on a computer system of educating a user about computer programming concepts, the method comprising:

allowing the user to designate a programming topic of interest;

providing the user with an annotation descriptive of the designated programming topic;

enabling the user to selectively execute a predefined interactive example instructive of the designated programming topic;

receiving information from source code associated with the predefined interactive example;

displaying a result of the selectively executed predefined interactive example; and simultaneously with execution of the predefined interactive example, automatically updating the annotation to display information that explains the displayed result of the predefined interactive example;

wherein:

executing the predefined interactive example includes extracting the received information from source code associated with the predefined interactive example, and providing the annotation descriptive of the designated programming topic includes extracting the received information from source code associated with the predefined interactive example instructive of the designated programming topic.

41. A computer-based method of instructing a user, the method comprising:

providing a user with access to predefined executable interactive examples and explanatory annotations descriptive of the executable interactive examples;

receiving information from source code associated with a predefined executable interactive example;

launching a predefined executable interactive example in response to user selection; and displaying corresponding portions of the explanatory annotations in synchronization with state changes in the launched executable interactive example;

wherein:

launching the predefined executable interactive example includes extracting the received information from source code associated with the predefined executable interactive example, and displaying corresponding portions of the explanatory annotations includes extracting the received information from source code associated with the predefined executable interactive example.

* * * * *